(12) United States Patent
Bultan

(10) Patent No.: US 10,615,899 B1
(45) Date of Patent: Apr. 7, 2020

(54) METHOD AND APPARATUS FOR IMPLEMENTING JOINT TIME FREQUENCY DIVISION MULTIPLEXING

(71) Applicant: Aykut Bultan, Santa Clara, CA (US)

(72) Inventor: Aykut Bultan, Santa Clara, CA (US)

( * ) Notice: Subject to any disclaimer, the term of this patent is extended or adjusted under 35 U.S.C. 154(b) by 34 days.

(21) Appl. No.: 15/174,729

(22) Filed: Jun. 6, 2016

Related U.S. Application Data

(60) Provisional application No. 62/171,278, filed on Jun. 5, 2015.

(51) Int. Cl.
*H04W 16/10* (2009.01)
*H04J 4/00* (2006.01)
*H04B 7/0413* (2017.01)
*H04L 5/00* (2006.01)

(52) U.S. Cl.
CPC .............. *H04J 4/00* (2013.01); *H04B 7/0413* (2013.01); *H04L 5/0007* (2013.01)

(58) Field of Classification Search
CPC ..... H04J 4/00; G01B 7/004; G01N 21/95692; H04W 16/10
See application file for complete search history.

(56) References Cited

U.S. PATENT DOCUMENTS

| 6,385,434 | B1 * | 5/2002 | Chuprun | H04W 16/10 |
| | | | | 455/11.1 |
| 2004/0131110 | A1 * | 7/2004 | Alard | H04L 1/0007 |
| | | | | 375/149 |
| 2012/0229768 | A1 * | 9/2012 | Gramatikov | A61B 3/113 |
| | | | | 351/215 |
| 2017/0102342 | A1 * | 4/2017 | Iwami | B32B 7/02 |

* cited by examiner

*Primary Examiner* — Wei Zhao
(74) *Attorney, Agent, or Firm* — Sheridan Ross P.C.

(57) ABSTRACT

In some embodiments, a signal transmitter includes a processor that converts information to be emitted into a plurality of signals, each signal having an emitting waveform, wherein at least two of the time-frequency distributions of emitting signal waveforms are separated from one another in the joint time-frequency plane by a parallelogram shaped regions. In some embodiments, a signal receiver includes a processor that separates received time-frequency spread waveforms from one another, the time-frequency spread waveforms are parallelogram-shaped in the joint time-frequency plane.

25 Claims, 21 Drawing Sheets

METHOD AND APPARATUS FOR IMPLEMENTING JOINT TIME FREQUENCY DIVISION MULTIPLEXING

CROSS REFERENCE TO RELATED APPLICATION

The present application claims the benefits of U.S. Provisional Application Ser. No. 62/171,278, filed Jun. 5, 2015, entitled "Method and apparatus for implementing joint time frequency division multiplexing", which is incorporated herein by this reference in its entirety.

FIELD

The present disclosure is related to wireless communication systems. More particularly, the disclosure is related to a method and apparatus for implementing joint time frequency-division multiplexing in wireless communications.

BACKGROUND

The most important challenge in wireless systems have always been faster and reliable wireless links. Recently, the need for higher data rates has grown exponentially over time leading to a problem called capacity crunch. Multi input multi output (MIMO) systems are one of the most important technologies to address this problem. Increasing the number of transmit and receive antennas to achieve higher wireless capacity has been the main trend in the wireless industry in recent years. High order MIMO and massive MIMO systems are typical examples of current MIMO technologies.

For MIMO systems to work successfully, accurate channel estimation is needed for each distinct link between receive and transmit antennas. To achieve this, a dedicated pilot signal is transmitted for each transmit antenna. As the number of transmit antennas increase, the number of pilot signals has to increase as well. This means more pilots occupy the transmit resources of the transmitter and significantly limit the transmit data rate. It is shown that the number of pilots required is a limiting factor of wireless capacity in high order or massive MIMO systems. Therefore, the problem is multiplexing as many pilots as possible into as few transmit resources as possible without creating interference between received pilot sequences. This requires design and selection of pilot sequences and their multiplexing scheme. The efficiency of such a scheme can be measured by the maximum number of pilots that can be transmitted per transmit symbol without any noticeable distortion in receiver channel estimation algorithms.

Ideally, the maximum number of pilots per transmit symbol is equal to the useful transmit symbol duration divided by the maximum channel delay spread. Note that the maximum number should be achieved without any compromise in channel estimation accuracy. In telecommunications, the delay spread is a measure of the multipath richness of a communications channel. In general, it can be interpreted as the difference between the time of arrival of the earliest significant multipath component (typically the line-of-sight component) and the time of arrival of the latest multipath components. In practice, achievable maximum number of pilots per symbol depends not only on the channel delay spread but also on the pilot sequences chosen and their multiplexing scheme.

Common sequences used as pilots for channel training include but not limited to pseudo noise like (PN), Walsh-Hadamard and perfect polyphase sequences (PPS). Another candidate is the cyclically shifted unit impulse sequence family. However, unit impulse sequence is difficult to use due to power amplifier ramp up problems and possible smoothing of the impulse function through transmitter front end processing among other problems. With the exception of the impulse sequence that is localized in time, all of the pilot sequences mentioned above are spread both in time and frequency without any localization.

In 3GPP UMTS and LTE systems, PN sequences are used for channel training in downlink such as Gold sequences. LTE uses PPS for the uplink. LTE uplink uses one transmit antenna; therefore, the maximum number of pilots per symbol is only one. In LTE downlink, there are only three pilots per OFDM symbol in average. Note that LTE pilots are staggered in time and frequency. Therefore, when calculating the maximum number of pilots per transmit symbol for LTE, the average number of distinct pilots per transmit symbol should be calculated from OFDM symbols that carry pilots within channel coherence time. For a normal cyclic prefix (CP), the channel with maximum delay spread is 5 μsec according to 3GPP standards. For a useful symbol length of 66.7 μsec this corresponds to 66.7/5~13 pilots that can be transmitted within a symbol simultaneously. Taking into account the unused subcarriers and edge effects between transmit symbol boundaries, it realistic to assume 12 pilots per transmit symbol as a maximum goal. However, the pilots that are transmitted per OFDM symbol is only three for LTE downlink. The difference is very significant. This is due to the fact that long channel delay spreads cause highly frequency selective channels that requires more samples in the frequency domain, thereby limiting the maximum number of pilots that can be transmitted. More efficient channel training solutions are needed for future wireless systems that demand much higher number of pilots.

SUMMARY

The present disclosure describes a method and apparatus for implementing joint time frequency-division multiplexing (JTFDM) for telecommunications. An exemplary application of JTFDM is channel training for wireless communications. JTFDM can achieve the maximum number of pilot sequences that can be sent without performance degradation. As shown in the detailed description section, this multiplexing technique can not only achieve the maximum number of pilots but also increase the accuracy of channel estimation by de-noising. JTFDM can be used for data communications in wireless systems, as well. In that case, it might be called as joint time frequency-division multiple access (JTFDMA). Specifically, this multiplexing technique can be quite useful for wideband and ultra wideband communications with fading channel conditions. JTFDM commonly includes three parts. A first part can be a family of pilot sequences that satisfy certain requirements. Commonly known requirements include good auto and cross correlation properties, wide band frequency spread to cover the whole data bandwidth, and sufficient number of distinct sequences and low peak to average power ratio (PAPR). It can have unique requirements of minimal joint time frequency spread. PPS such as Zadoff-Chu, Frank and generalized chirp like (GCL) sequences satisfy all of these properties with some modifications. A second part typically requires a joint time-frequency multiplexing scheme for these sequences. Since these sequences are spread both in time and frequency they cannot be de-multiplexed in either domain alone. A final part can describe joint time frequency-based filtering methods to de-multiplex these sequences.

These and other advantages will be apparent from the disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

"Base station" (BS) includes but is not limited to a Node-B, a base station, a site controller or any other type of interfacing device in a wireless environment.

The term "computer-readable medium" as used herein refers to any computer-readable storage and/or transmission medium that participate in providing instructions to a processor for execution. Such a computer-readable medium can be tangible, non-transitory, and non-transient and take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device. A computer readable signal medium may convey a propagated data signal with computer readable program code embodied therein, for example, in baseband or as part of a carrier wave. Such a propagated signal may take any of a variety of forms, including, but not limited to, electromagnetic, optical, or any suitable combination thereof. Program code embodied on a computer readable signal medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section(s) 112(f) and/or 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

"User equipment" (UE) includes but is not limited to a user equipment, a wireless transmit/receive unit, a fixed or mobile subscriber unit, a pager, or any other type of device capable of operating in a wireless environment.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below. Also, while the disclosure is

DETAILED DESCRIPTION

Figure 1:
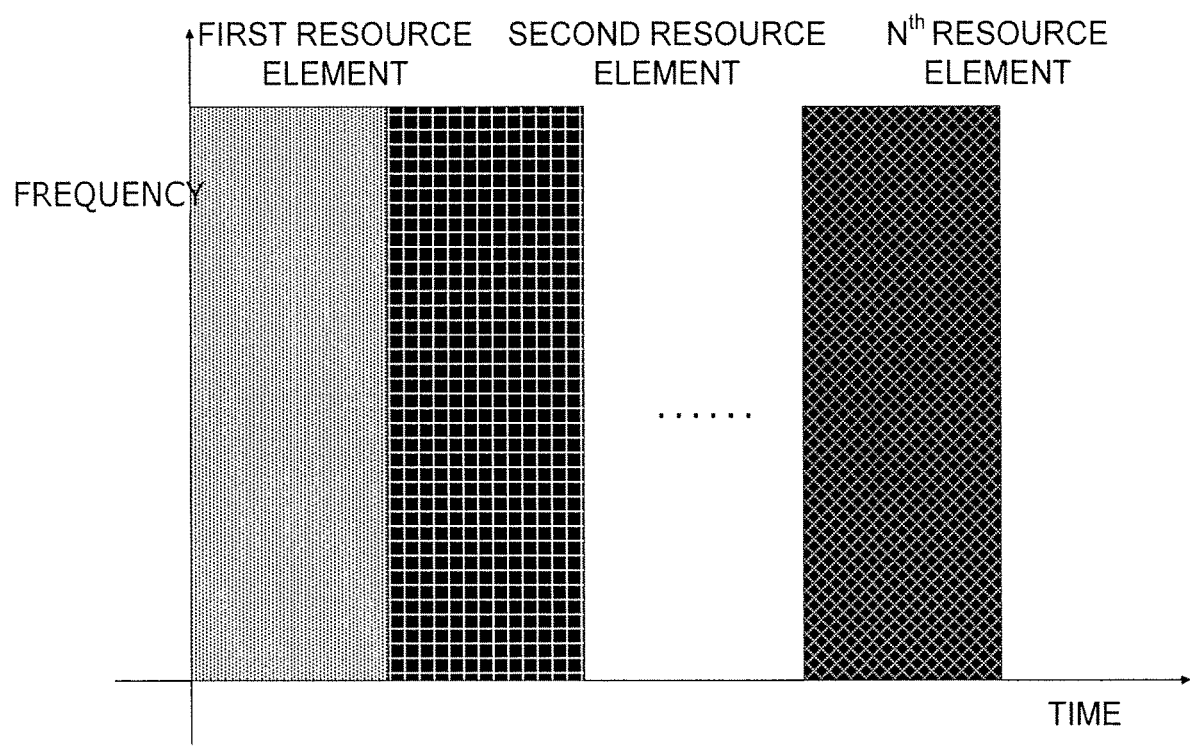
FIG. 1 shows time division multiplexing (TDM) in the joint time-frequency (JTF) plane.
Figure 2:
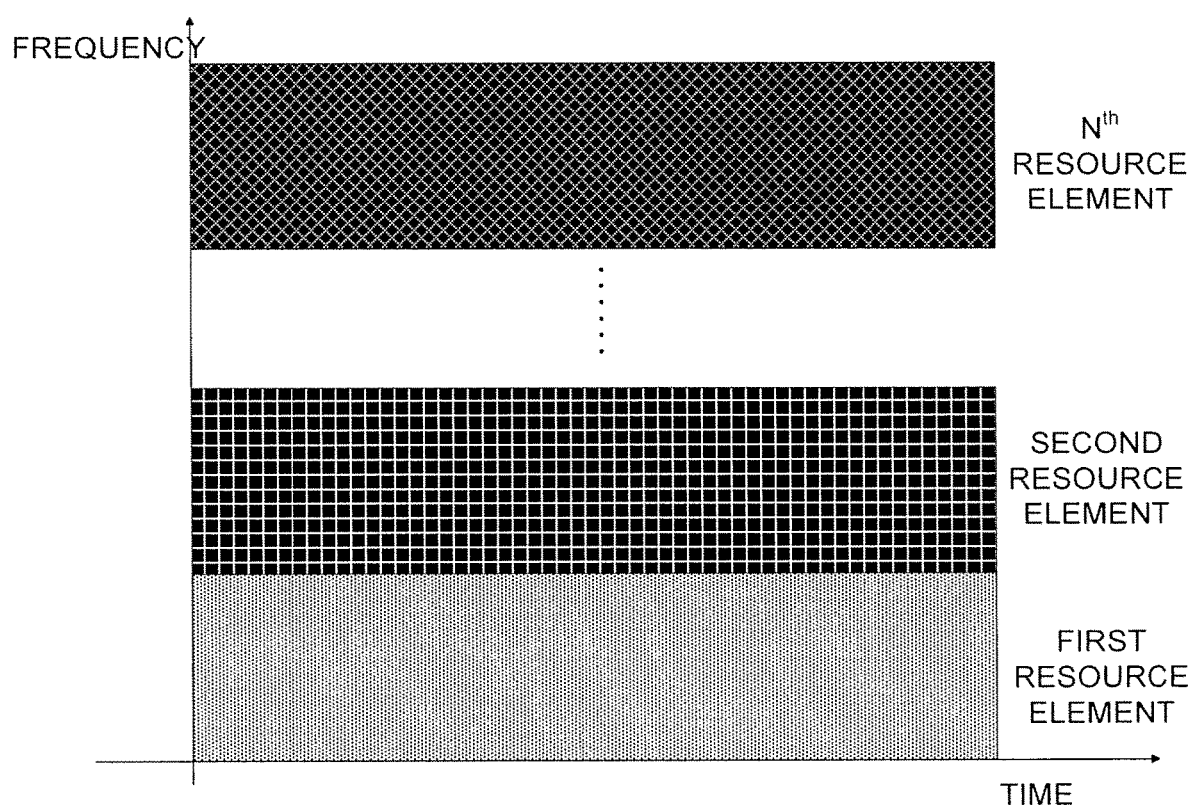
FIG. 2 shows frequency division multiplexing (FDM) in the joint JTF plane.

In wireless communications there are three resources for transmission of information: Time, frequency and spatial dimension. A spatial resource can be a simple transmit antenna or it might be achieved by using spatial layers such as beams. Multiplexing is used to transmit series of separate signals over the time frequency and spatial resources. There are four known categories of multiplexing in prior art. Time-division multiplexing (TDM) is a method of putting multiple data streams in a single signal by separating the signal into many segments in time, each having a very short duration. A typical TDM is shown in FIG. 1 in the joint time-frequency (JTF) plane. Each individual data stream is reassembled at the receiving end based on the timing. Frequency-division multiplexing (FDM) is a technique by which the total bandwidth available in a communication medium is divided into a series of non-overlapping frequency sub-bands, each of which is used to carry a separate signal. A typical FDM scheme shown in FIG. 2. Spatial division multiplexing (SDM) means transmitting separate signals from different spatial resources using the same time and frequency resources. Finally, code division multiplexing (CDM) means sending distinct signals that use codes of their own while using the same time frequency and spatial resources. Signal de-multiplexing in the receiver is achieved through use of orthogonal codes to separate distinct signals. Any combinations of the mentioned multiplexing techniques might also exist in prior art.

When pilots are used for channel estimation, the assumption is that the wireless channel is relatively constant within its coherence time, so that block channel estimation can be performed. Also, linear finite impulse response (FIR) channel model is assumed. This means a received signal corresponding to pilot transmission is a convolution of pilot signal with channel impulse response. This results in a pilot signal extended by the channel delay spread. Therefore, to multiplex multiple pilots in time without any resulting interference in the receiver, they should be at least apart from each other in time proportional to the maximum delay spread of the channel. If the separation is less than this, then there will be degradation in performance. Therefore, the maximum number of pilots that can be transmitted per symbol, $N_P$, is equal to $$N_P = \frac{T_u}{T_{d,max}} \quad (1)$$

where $T_{d,max}$ is maximum delay spread of the channel and $T_u$ is the useful symbol duration. For example, in OFDM systems useful symbol duration is equal to symbol duration, $T_{sym}$, minus the cyclic prefix (CP) length. The goal is to achieve this maximum number without any distortion in channel estimation. This is very important because only then, the true potential of high order MIMO systems are achieved. As an example, a wireless forward link capacity in bits/sec for a MIMO system can be written as $$C = \left(\frac{T_{slot} - T_{pilot}}{T_{slot}}\right)\left(\frac{T_u}{T_{sym}}\right) B \log_2\left[\det\left(I_{N_R} + \frac{\rho}{M_T} HH^*\right)\right] \quad (2)$$

where B is the bandwidth used in Hz, H is the $N_R \times M_T$ channel matrix of $N_R$ receive and $M_T$ transmit antennas, $I_{N_R}$ denotes the identity matrix of size $N_R$, $\rho$ is average signal to noise ratio (SNR) of the link, $T_{slot}$ is the duration of a timeslot in seconds, and $T_{pilot}$ is the duration of all the pilot sequences required in seconds. $T_{pilot}$ can be written as $$T_{pilot} = \frac{M_T}{N_P} T_{sym} \quad (3)$$

Therefore, as $N_P$ increases, the capacity of the link increases. Note that the capacity is limited by the achievable maximum number of pilots that can be transmitted per symbol.

In LTE downlink, FDM and TDM are used together for multiplexing of pilots. FDM scheme for pilots is designed to cope with frequency selectivity due to delay spread of the channel. TDM scheme is designed to deal with Doppler frequency due to mobile speed. FDM density of LTE downlink depends on the channel coherence bandwidth. Channel coherence bandwidth is inversely proportional to channel delay spread. Channel coherence bandwidth formulas for 50% and 90% correlations are given below.

$$B_{c,90\%} \approx \frac{1}{50T_{d,rms}}, \quad (4)$$

$$B_{c,50\%} \approx \frac{1}{5T_{d,rms}}, \quad (5)$$

where $T_{d,rms}$ is root mean square (rms) of the channel delay spread. Note that rms channel delay spread is proportional to maximum channel delay spread. For LTE, $T_{d,rms}$=991 nsec, and $T_{d,max}$=5 μsec from 3GPP documents. Therefore, $B_{c,90\%}$=20 KHz and $B_{c,50\%}$=200 KHz. The FDM efficiency or $N_P$ increases if the pilot spacing in frequency is as much as possible. However, the pilot spacing cannot go above channel coherence bandwidth without channel estimation degradation in the receiver. So, the FDM pilot design is a compromise between channel estimation quality and data rate. After many comprehensive studies and research through 3GPP partners, the maximum spacing between two reference symbols in frequency is selected as 45 KHz. For a subcarrier spacing of 15 KHz, only three pilots can be multiplexed per OFDM symbol in LTE downlink. Therefore, for LTE DL, only $N_P$=3 is achieved instead of the maximum of 12 as explained before. In LTE-A downlink, although new pilots sequences are being added, the maximum number of pilots per symbol does not change at all.

For LTE-A uplink, the number of pilots is close to the maximum. However, to achieve this, channel estimation performance is sacrificed. It is well known that LTE-A uplink pilot scheme only work partially with slow fading channels. Even the introduction of orthogonal cover codes (OCC) does not solve the problem. Because when the channel delay spread is large, orthogonality of the pilots do not work anymore. The dilemma here is that LTE uplink need to support more transmit antennas for higher rates. Due to the lack of better solution, 3GPP supports a poor performing scheme. The solution presented in this disclosure do not have any restrictions on the mobile channel or performance degradations due to loss of orthogonality.

One way to achieve the maximum number of pilots per symbol is to use impulse sequences as pilot signals. As explained before, impulse type pilots are not useful in real life wireless applications. This is why none of the commonly used pilot sequences in wireless systems are localized in time like unit impulse. This has resulted in prior art systems not achieving the maximum number of pilots per symbol without performance degradation. The only practical solution is to use wideband sequences that are localized in the JTF plane and multiplexed and de-multiplexed as explained in this disclosure. The sequences suggested in this disclosure are PPS. However, using these sequences alone may not solve the problem. These sequences need to be concatenated, multiplexed and de-multiplexed in specific ways as described here.

A complex valued sequence is polyphase when it has constant magnitude. A sequence is perfect when it has ideal correlation properties, which means it has zero out-of-phase autocorrelation and minimum cross-correlation side lobes. A complex-valued sequence is PPS when it is both polyphase and perfect. Some commonly known PPS include: Frank, Zadoff, Chu, Zadoff-Chu and generalized chirp like (GCL) sequences. One of the oldest known PPS are called Frank sequences. The elements of the original Frank sequence of period N where $N=L^2$ are defined as $$r(mL + n) = \exp(j\varphi_{m,n}), \quad (6)$$

$$\varphi_{m,n} = \frac{2\pi}{L} smn, m = 0, 1, \ldots L-1, n = 0, 1, \ldots L-1,$$

where $j=\sqrt{-1}$, and s is any integer relatively prime to L.

While the Frank sequences are only applicable for perfect square lengths, Zadoff sequences are applicable for any length and is given by $$r(n) = \exp(j\varphi_n), \quad (7)$$

$$\varphi_n = \frac{2\pi}{N}\left(s\frac{N-n}{2} - q\right)n, n = 0, 1, \ldots N-1; 0 \leq q < N,$$

where s is any integer relatively prime to N. For any given length N, different variants of the Zadoff sequence are obtained by changing s and q and adding constant phase shift to all elements. It can be shown that the permutations that preserve the ideal autocorrelation function property such as cyclic shift, decimation, conjugation, etc. are equivalent to changing s and q. An important permutation of the Zadoff sequence was presented by Chu and is given by $$r(n) = \exp(j\varphi_n), \quad (8)$$

$$\varphi_n = \begin{cases} \frac{j2\pi}{N} s \frac{n^2}{2}, & N \text{ even} \\ \frac{j2\pi}{N} s \frac{n(n+1)}{2}, & N \text{ odd} \end{cases},$$

$$n = 0, 1, \ldots N-1,$$

where s is any integer relatively prime to N. A popular version used frequently is somewhat mixed version of the above and called Zadoff-Chu sequence $$r(n) = \exp(j\varphi_n), \quad (9)$$

$$\varphi_n = \begin{cases} \frac{j2\pi}{N} s\left(\frac{n^2}{2} + qn\right), & N \text{ even} \\ \frac{j2\pi}{N} s\left(\frac{n(n+1)}{2} + qn\right), & N \text{ odd} \end{cases},$$

$$n = 0, 1, \ldots N-1; 0 \leq q < N,$$

where s is any integer relatively prime to N.

Generalized chirp-like (GCL) sequences are another class of PPS derived from Zadoff-Chu sequences $$r_{GCL}(n) = a(n \bmod L) r_{ZC}(n), n = 0, 1, \ldots, N-1 \quad (10)$$

where $r_{zc}(n)$ is a Zadoff-Chu sequence, $a(n)$ is any complex sequence with magnitude equal to one, $N=mL^2$, and in and L are positive integers.

Any desired reference sequence of length $N_T$ can be obtained by truncating a PPS where $N \geq N_T$. In this disclosure, the parameter ranges of the above defined sequences from the prior art are extended. The parameter values of s=0.5 and s=−0.5 are also added to the above defined sequences.

These PPS have many nice properties to qualify for pilot sequences such as excellent auto and cross correlation behavior, wide bandwidth, low PAPR, large family of sequences. However, they have another property that is mostly unexplored by the wireless community. They are localized in the joint time-frequency plane. Note that, PPS are spread both in time and frequency as separate domains. However, they have very concentrated energy distribution in the joint time-frequency plane. Classical Fourier Transform (FT) cannot display such behavior. A joint time-frequency energy distribution (TFD) is needed to analyze such behavior. One of the most well known TFD is Wigner distribution (WD) that can be defined as $$WD_f(t, w) = \int_{-\infty}^{+\infty} f\left(t + \frac{\tau}{2}\right) f^*\left(t - \frac{\tau}{2}\right) e^{-jwt} d\tau, \qquad (11)$$

where t stands for time and w for angular frequency. Note that WD is a real valued quadratic function.

Figure 3:
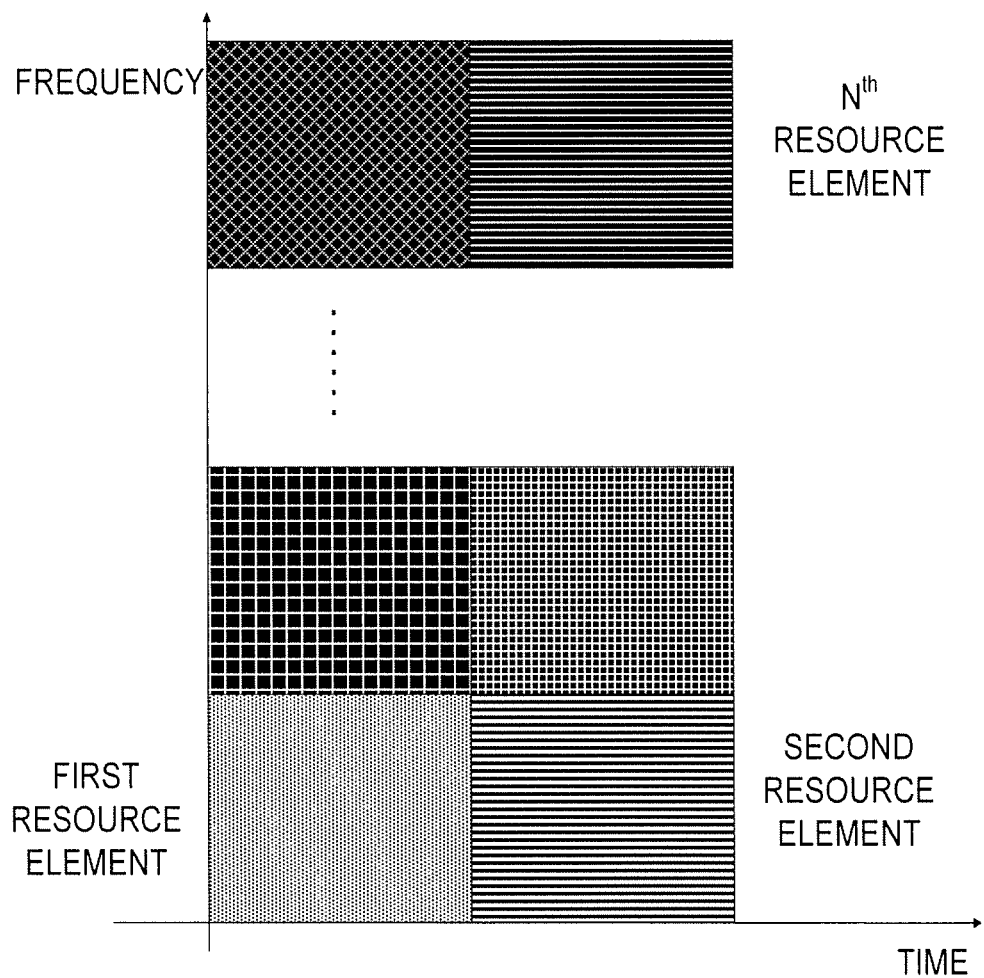
FIG. 3 shows combined TDM and FDM in the JTF plane.
Figure 4:
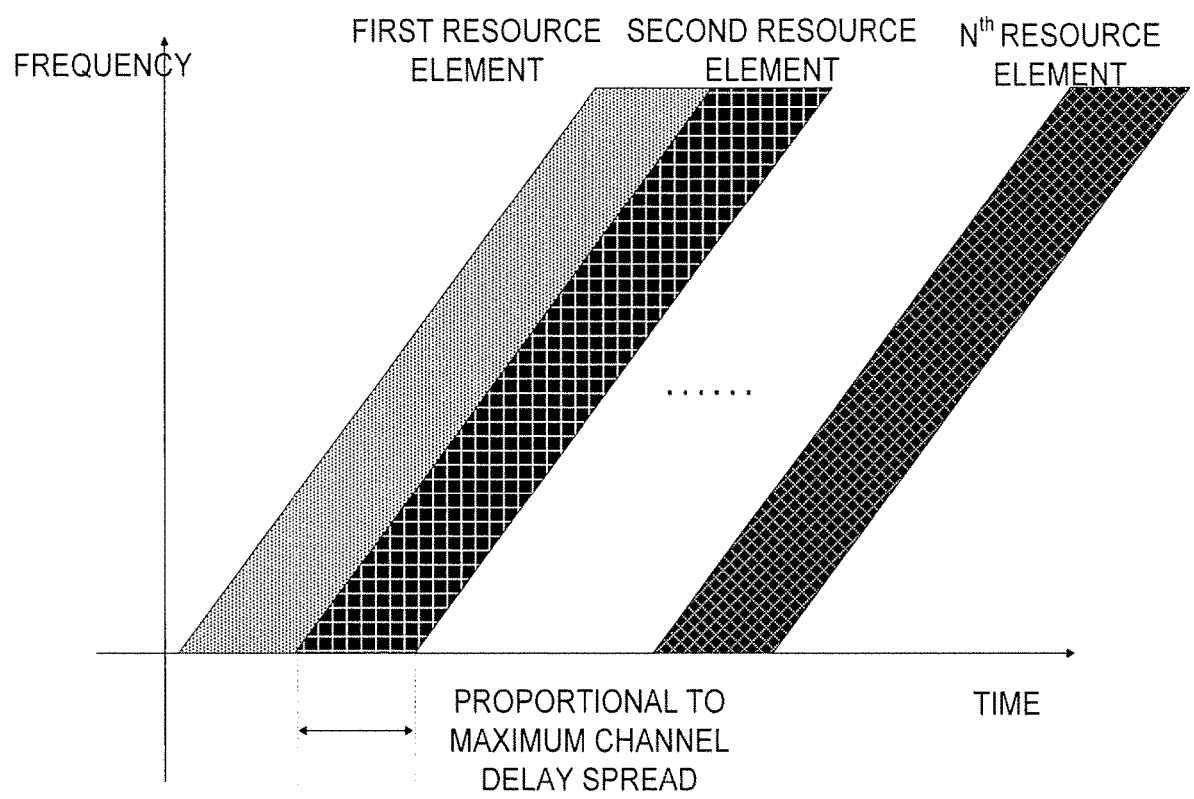
FIG. 4 shows joint time-frequency division multiplexing (JTFDM) in the joint JTF plane.
Figure 5:
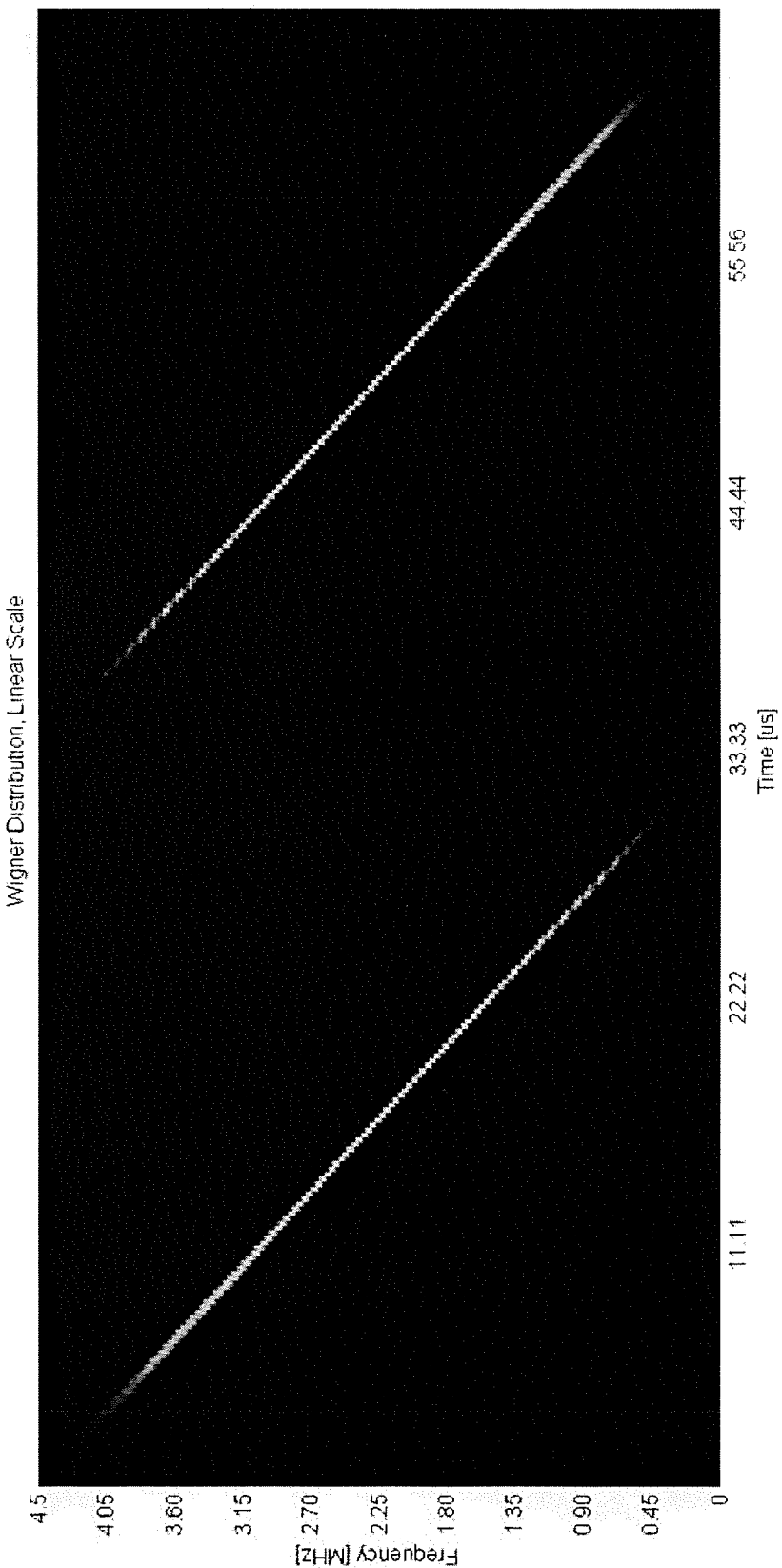
FIG. 5 shows Wigner distribution (WD) of Zadoff-Chu pilot sequence for s=−1.

WD of Zadoff-Chu sequence for s=−1 is shown in FIG. 5. Note that the energy of the signal is focused around its instantaneous frequency (IF) line. This observation can be used in a new multiplexing scheme. PPS can be multiplexed in the joint time-frequency plane by using JTF filters centered around their instantaneous frequency lines. First PPS is set at zero time shift. The next one is cyclic shifted in time proportional to maximum delay spread. Each following pilot sequence is time-shifted from the previous one by an amount equal to the maximum delay spread. Pilot sequences so generated can be used by different antennas of the same BS or can be shared by different cells. This multiplexing scheme is shown in FIG. 4 and called joint time-frequency division multiplexing (JTFDM) by simple pilots. Note that this is not a combination of TDM and FDM which can multiplex in time and frequency independently as shown in FIG. 3. However, JTFDM needs to be multiplexed in the joint time-frequency plane to prevent overlapping of the multiplexed signals.

One might argue that this multiplexing might also be achieved through CDM by time shifting the PPS. However, there is an important difference. CDM relies on orthogonality of PPS. This is valid only for no delay spread or flat fading channel. When there is delay spread and frequency selective channel, orthogonality no longer holds. As the delay spread increases, the orthogonality degrades even more. On the other hand, JTFDM does not rely on orthogonality for frequency selective channel. JTFDM use joint time-frequency (JTF) filters to de-multiplex the pilots. This ensures that pilots do not interfere with each other even when there is maximum delay spread. Another difference might come from JTF filter implementation. Strictly speaking, there is no ideal JTF filter to de-multiplex at the exact time-frequency region defined. Therefore, if the delay spread is small, it is a good idea to consider cyclic shifts slightly larger than maximum delay spread to accommodate non-ideal JTF filtering. In practice, this filter factor should be proportional to the time spread of the JTF filters that are used. Most of the time, leaving 1-10% extra distance between shifted pilots is good enough to accommodate JTF filtering.

Note that JTFDM can be combined with other multiplexing techniques as well based on the applications. For example, for future OFDM MIMO systems, FDM and TDM of pilots can be combined with JTFDM. FDM takes advantage of channel coherence bandwidth and TDM can be used to cope with channel coherence time.

JTF filtering includes three parts. Calculating the TFD of the signal, applying JTF domain filter and finally taking the inverse TFD to obtain JTF filtered signal. Since there are many different TFD tools, there are different ways to implement this. However, the JTF filtering scheme remains similar. The basic idea is to design a JTF filter that corresponds to signal energy around the instantaneous frequency of the pilot being used. The pass-band of the filter in time covers the area bound by delay spread of the channel from the instantaneous frequency line. One of the popular TFD is discrete Gabor transform (DGT) which is described below.

For an input signal y(n) of period N, inverse DGT (IDGT) and DGT are defined through following equations $$y(n) = \sum_{m=0}^{M-1} \sum_{k=0}^{K-1} G_{m,k} w_{m,k}(n) \qquad (12)$$

$$G_{m,k} = \sum_{n=0}^{N-1} y(n) \beta_{m,k}^*(n)$$

$$w_{m,k}(n) = w(n - m\Delta M) W_N^{k \Delta K n}$$

$$\beta_{m,k}(n) = \beta(n - m\Delta M) W_N^{k \Delta K n}$$

$$W_N = e^{j\frac{2\pi}{N}}$$

$$0 \le m \le M1, 0 \le k \le K1, 0 \le n \le N1$$

where w(n) is a synthesis window function β(n) is an analysis window function of period N, and ΔM and ΔK are time and frequency sampling intervals, respectively. Whereas M and K are the number of sampling points in time and frequency domains. The coefficients $G_{m,k}$ are called the DGT of the signal y(n) and the equation for y(n) is called the IDGT. Synthesis window function in the original DGT is selected as a Gaussian, which can be written as $$w(n) = (\pi\sigma^2)^{-\frac{1}{4}} \exp\left(-\frac{(n - 0.5(N-1))^2}{2\sigma^2}\right). \qquad (13)$$

Then the analysis and synthesis window functions needs to satisfy the completeness condition as defined below $$\sum_{n=0}^{N-1} w(n + mK) W_N^{-kMn} \beta^*(n) = \delta(m)\delta(k), \qquad (14)$$

$$0 \le m \le \Delta K - 1, 0 \le k \le \Delta M - 1,$$

where ΔM and ΔK are the time and the frequency sampling interval lengths, and M and K are the numbers of sampling points in the time and the frequency domains, respectively. The following relation should be satisfied for completeness condition to be true $$M\Delta M = K\Delta K = N, MK \ge N \qquad (15)$$

The condition MK=N is called the critical sampling and the ratio of MK/N is called the over-sampling ratio. Critically sampled case provides a unique solution for the synthesis window. However, the JTF localization of the synthesis window might not be satisfactory. When over-sampled DGT is used, the synthesis window function is not unique since the completeness condition defines and under determined linear system. This provides an opportunity to put further restrictions on the synthesis window such as similarity to the analysis window. This will ensure that the JTF localization is preserved and more orthogonal like representation is achieved. In this disclosure, over-sampled systems are suggested for better resolution but it is not a necessary condition for the system described herein to work successfully.

The DGT coefficients and input signal can be represented in matrix forms as follows $$G = (G_{0,0}, G_{0,1}, \ldots, G_{M-1,K-1})^T \qquad (16)$$

$$y = (y(0), y(1), \ldots, y(N-1))^T \qquad (17)$$

The DGT can be represented by using the MK×N matrix B whose (m K+k)th row and nth column element is given by $$\beta^*_{m,k}(n) = \beta^*(n - m\Delta M) W_N^{-k\Delta K n}, 0 \le m \le M-1, 0 \le k \le K-1, \\ 0 \le n \le N-1. \qquad (18)$$

The IDGT can be represented by using the N×MK matrix W whose nth row and (m K+k)th column element is given by $$w_{m,k}(n) = w(n - m\Delta M) W_N^{k\Delta K n}, 0 \le m \le M-1, 0 \le k \le K-1, \\ 0 \le n \le N-1. \qquad (19)$$

Therefore, the analysis and synthesis equations can be written in matrix form as follows $$G = By, \text{ and } y = WG. \qquad (20)$$

The condition in equation (14) implies that $$WB = I \qquad (21)$$

where I is the identity matrix.

Performance of JTF filtering depends on the specific TFD being used. It is well known that in JTF domain signal energy cannot be resolved less than specified by the uncertainty relation. This means that one cannot obtain the highest time and frequency resolution at the same time. If time resolution increases, frequency resolution decreases and vice versa. WD is known to be the highest resolution TFD. However, due to its cross terms, it is difficult to interpret for complex signals. DGT is popular because it does not have cross terms and it has an efficient computational algorithm. Note that DGT uses Gaussian functions that satisfy the uncertainty relation with minimum bound. That means they provide the highest atomic resolution of energy distribution in JTF domain. However, when PPS are analyzed by classical DGT, chirp like signals are represented by many time frequency shifted Gaussians. This result in loss of JTF resolution and loss of JTF filtering performance.

To overcome this, we define a DGT that compactly represent the pilots being used. To achieve this, the synthesis window needs to match pilot signals being used better than simple Gaussian. There are different ways of achieving this. For example, for any pilot sequence defined in this disclosure, we modify the Gaussian synthesis windows by multiplying it with the pilot sequence, r(n), as follows $$\hat{w}(n) = w(n)r(n), \qquad (22)$$

where $\hat{w}(n)$ is the new synthesis window. The corresponding analysis window, $\hat{\beta}(n)$, is obtained by solving the completeness condition below $$\sum_{n=0}^{N-1} \hat{w}(n + mK) W_N^{-kMn} \hat{\beta}^*(n) = \delta(m)\delta(k), \qquad (23)$$
$$0 \le m \le \Delta K - 1, 0 \le k \le \Delta M - 1$$

For OFDM systems, pilots are inserted directly in the frequency domain. In that case, the following synthesis window function might be used $$\hat{w}(n) = w(n)\text{IDFT}\{r(k)\}, \qquad (24)$$

where the inverse Fourier transform of the pilot sequence is multiplied by the Gaussian to obtain the final synthesis window. However, since the DFT of polyphase sequence is also a polyphase sequence, and the DFT of Gaussian is also Gaussian, the following synthesis function might also work although not preferred $$\hat{w}(n) = \text{IDFT}\{W(k)r(k)\}, \qquad (25)$$

where W(k) is the DFT of w(n) and r(k) is the pilot added in the frequency domain. Note that, the resulting time domain synthesis window function is a convolution of the Gaussian window with the polyphase sequence for this case. Also, trying different values of σ in equation (13) gives another level of flexibility for designing synthesis window. As the final option, one can also use fractional Fourier transformation (FRFT) to obtain the new synthesis window from the Gaussian function. $\text{FRFT}_{-\alpha}$ corresponds to rotating the TFD of the window function by a degrees in counter clockwise direction. Better performing Gabor transformation might be obtained compared to classical Gaussian based DGT, if the FRFT of the Gaussian is taken at the JTF angle that is equal to angle of the slope of the PPS pilot that is selected $$\hat{w}(n) = \text{FRFT}_{-\alpha}\{w(n)\} \qquad (26)$$

The $\text{FRFT}_{-\alpha}$ of the continuous Gaussian can be written as $$g_{\sigma,\alpha}(t) = \frac{1}{\pi^{1/4}\sqrt{\gamma(\sigma,\alpha)}} \exp\left(-z(\sigma,\alpha)\frac{t^2}{2}\right) \qquad (27)$$

$$\gamma(\sigma,\alpha) = \frac{\sqrt{\sin^2\alpha + \sigma^4\cos^2\alpha}}{\sigma}$$

$$z(\sigma,\alpha) = \frac{1}{\gamma^2(\sigma,\alpha)} - j\frac{(\sigma^4 - 1)\cos\alpha\sin\alpha}{\sin^2\alpha + \sigma^4\cos^2\alpha}.$$

The sampled version in normalized time-frequency plane can be written as $$g_{\sigma,\alpha}(n) = \frac{K_{\sigma,\alpha}}{\pi^{1/4}\sqrt{\gamma(\sigma,\alpha)}} \sum_{r=-\infty}^{\infty} \exp\left(-\frac{\pi}{N}z(\sigma,\alpha)(n+rN)^2\right) \qquad (28)$$

where $K_{\sigma,\alpha}$ is a normalization constant for each $g_{\sigma,\alpha}(n)$ such that $$\|g_{\sigma,\alpha}(n)\| = 1 \qquad (29)$$

These permutations of the synthesis window might be useful under different wireless system and channel requirements. They can be selected empirically based on the minimization of channel estimation error. Channel estimation error is the difference between the actual channel response, which is also called as ideal channel estimation, and the estimated channel response from the channel estimation algorithm.

De-multiplexing in the receiver is obtained by filtering the Gabor coefficients. This is achieved by a JTF pilot filter that includes ones and zeros. The pilot filter is designed such that it is equal to ones in the JTF region where pilot energy is focused and zeros elsewhere. De-multiplexing in the receiver can be accomplished by taking the DGT of the signal and then multiplying the DGT coefficients with the pilot filter and finally taking the IDGT of the filtered signal. Although not strictly necessary, this process can be repeated once or twice to get slightly better results. The iterations are useful for close to or equal to critically sampled cases where analysis and synthesis windows might be quite different. Effect of iterations diminishes as the oversampling ratio in DGT increases. For oversampling ratios of four and higher, the analysis and synthesis windows become almost identical which results in orthogonal like representation. The pilot filter can be represented by an MK by MK matrix as F. Note that this filter matrix is a diagonal matrix with entries equal to only zero or one. The time-frequency domain iterative filtering can be represented by $G_1 = By$ $\hat{G}_1 = FG_1$ $y_1 = W\hat{G}_1$ $G_2 = By_1$ $\hat{G}_2 = FG_2$ $y_2 = W\hat{G}_2$

... (30)

To obtain a pilot filter, two methods can be used. In the first method, a line is drawn in JTF plane along the instantaneous frequency line of the pilot. Then a parallelogram is formed that extends from this line by an amount equal to the maximum channel delay spread. These regions are shown in FIG. 4 for family of pilots. The pilot filter is equal to ones inside the parallelogram and zeros outside of the parallelogram. The filter can be slightly extended in both directions to cover for time-frequency spread originating from Gabor atoms. Note that for each specific pilot, nonzero filter coefficients are placed in different time-frequency locations.

In the second method, the pilot filter is obtained empirically. For a given pilot, set of simulation experiments have been performed using Monte Carlo approach. Selected pilot is transmitted through a wireless channel which has a maximum delay spread with no noise. The channel delay profile, their power levels and Doppler speed are changed within the limits specified by the wireless standards being considered. For example, for LTE, Doppler frequency offsets from 1 Hz to 300 Hz are being used with a maximum delay spread of 5 us. Number of paths from 2 to 50 are being distributed in a semi random fashion within this delay spread. For each simulation run, all these parameters are randomly changed within their limits. For each run, DGT of the received signal is obtained and for any coefficient above a threshold, the corresponding pilot coefficient is set to one, otherwise it is set to zero. Threshold is calculated with respect to an average power of the coefficients. In our experiments, thresholds ranging from 5% to 25% worked fine. However, this threshold is not claimed to be optimum. It is one of the settings that simply works. This threshold procedure for each simulation run can be written as $$\eta_r = \frac{1}{MK} \sum_{m=0}^{M-1} \sum_{k=0}^{K-1} |G_{m,k}|^2 \quad (31)$$

$$\tilde{F}((mM+k+1), (mM+k+1)) = \begin{cases} 1, & \text{if } |G_{m,k}|^2 \geq \mu \cdot \eta_r \\ 0, & \text{else} \end{cases} \quad (32)$$

where $0.05 \leq \mu \leq 0.25$.

The final JTF filter is obtained simply by statistical average of all filters from all the simulations runs.

$$F = E\{\tilde{F}\} \quad (33)$$

The pilot filters so obtained can be stored in a look-up table for each pilot in the wireless system. The resulting average filter matrix can be quantized to few values only including binary. Since each value can be represented with few bits, this might be implemented very efficiently without requiring much storage. These pilot filters effectively de-multiplex the received pilots without any distortion. During the de-multiplexing operation pilot filter suppresses any received signal component outside of its nonzero region. The area of nonzero parallelogram region is approximately equal to maximum delay spread times pilot length. That means any noise outside of this region is eliminated. This is called de-noising and it significantly improves the channel estimation accuracy. The improvement in pilot SNR can be approximated as $$\frac{SNR_{out}}{SNR_{in}} \approx 10\log_{10}\left(\frac{N}{N_{ds}}\right) \quad (34)$$

where N is the length of the pilot sequence in samples and $N_{ds}$ is proportional to maximum delay spread in terms of signal samples. This results in substantial decrease in channel estimation error. Note that JTFD de-multiplexing improve the input SNR of the channel estimation. Performance of any estimation algorithm improves as its input SNR increases. Therefore, JTFDM is independent of the specific channel estimation algorithms being used in the receiver. As the channel estimation error decreases this reduces the bit error rate (BER) and block error rate (BLER) of the receiver. The final effect becomes an improved link performance through higher throughput and increased range and more reliable service.

Until this point, some parameters are kept flexible to show the extent of the algorithms presented in this disclosure. Most of the results are obtained with equations (22), (23) and (24) with unit Gaussian as base window. Unit Gaussian is obtained with σ=1 in equation (13), which corresponds to time and frequency spreads of the synthesis window being equal. Some preferred parameters of the Gabor transform are as follows. Time and frequency sampling intervals are selected as equal, ΔM=ΔK. Oversampling ratio for Gabor is selected as 4. This makes the corresponding Gabor transform a tight frame. The advantage of tight frame is that analysis and synthesis windows are almost identical. This increases time-frequency localization of the overall transformation. Oversampling also increase the de-noising power of the JTFDM scheme. Another advantage is that iterative JTF effect is decreased and even one iteration might provide sufficient results.

Throughout this disclosure it is mentioned that for JTFDM to work the pilot sequences need to be localized in the JTF plane. Although all of the PPS are localized in the JTF plane, few of them are more suitable for multiplexing and de-multiplexing operation. Some pilots with instantaneous frequency (IF) line with a slope close to unity or angle of the slope close to 45 degree are preferable. As the chirp rate is increased or decreased the slope of the chirp deviates from the unity slope. This results in multiple chirp lines crossing in the JTF plane. The JTFD de-multiplexing requires a JTF filter that has pass-band in time from the IF line of the chirp to the time shift of maximum delay spread from that line. This means multiple chirp lines from one PPS might interfere with another sequence from the same PPS family. To prevent this, the root sequences are restricted to the ones that have close to unity slope in their IF line. For example for Frank, Zadoff, Chu, Zadoff-Chu and GCL sequences root parameter, s, equal to −1, −0.5, 0.5 and 1 create the most suitable sequences for multiplexing and de-noising. As the absolute value of the root parameter, |s|, goes above one, the performance of the JTFD demultiplexing degrades.

Figure 17:
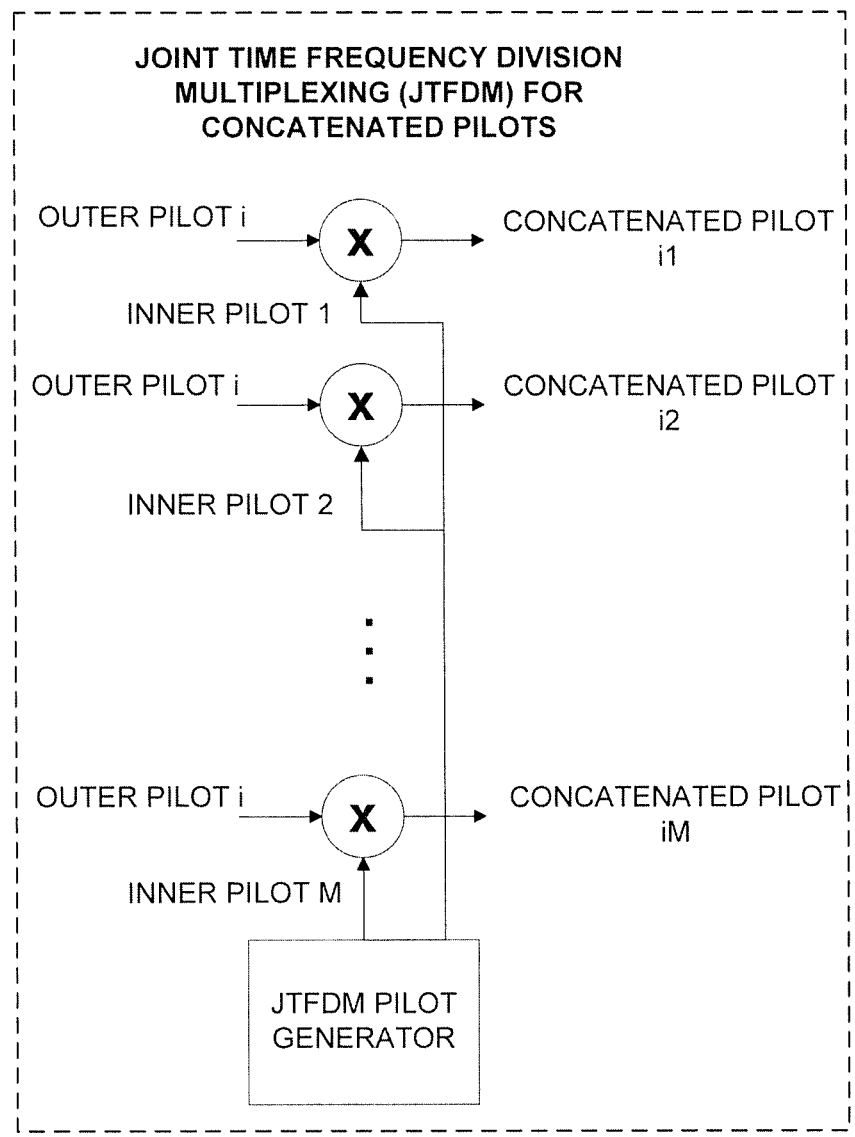
FIG. 17 shows JTFDM concatenated pilot generation in transmitter.

However, this selection reduce the number of available pilots to cyclic shifts only. To support a high order of multi transmit antennas in a multi cell environment, a large family of orthogonal pilots are required. The solution is to use concatenated pilots. Two pilot sequences can be combined together to form a new pilot sequence. Outer pilot sequence can be any sequence with required pilot properties such as good auto and cross correlation performance and with wideband characteristics. Also, this outer sequence has to have a constant magnitude. That means outer sequence can be any pilot sequence such as PN sequences or Hadamard sequences in addition to PPS. However, if the good PAPR is required, PPS are suggested. Note that if PPS are used as outer sequence, they do not need to have a slope close to one. They can have any slope in the family of the sequences. The block diagram of concatenated pilots are shown in FIG. 17. Note that concatenated pilots are obtained by scrambling the outer pilot by the inner pilot sequence. Scrambling means multiplication of sequences element by element. It can be written as $$r_c(n)=r_o(n)r_i(n), 0 \leq n \leq N-1, \quad (35)$$

where $r_i(n)$ means inner pilot sequence, $r_o(n)$ outer pilot sequence, $r_c(n)$ is concatenated pilot sequence and N is the length of all the sequences. The inner sequence are selected from PPS that have roots close to unity slope. The inner sequences are obtained by cyclic shifts of such root sequences. As explained before each cyclic shift is proportional to maximum delay spread.

Figure 10:
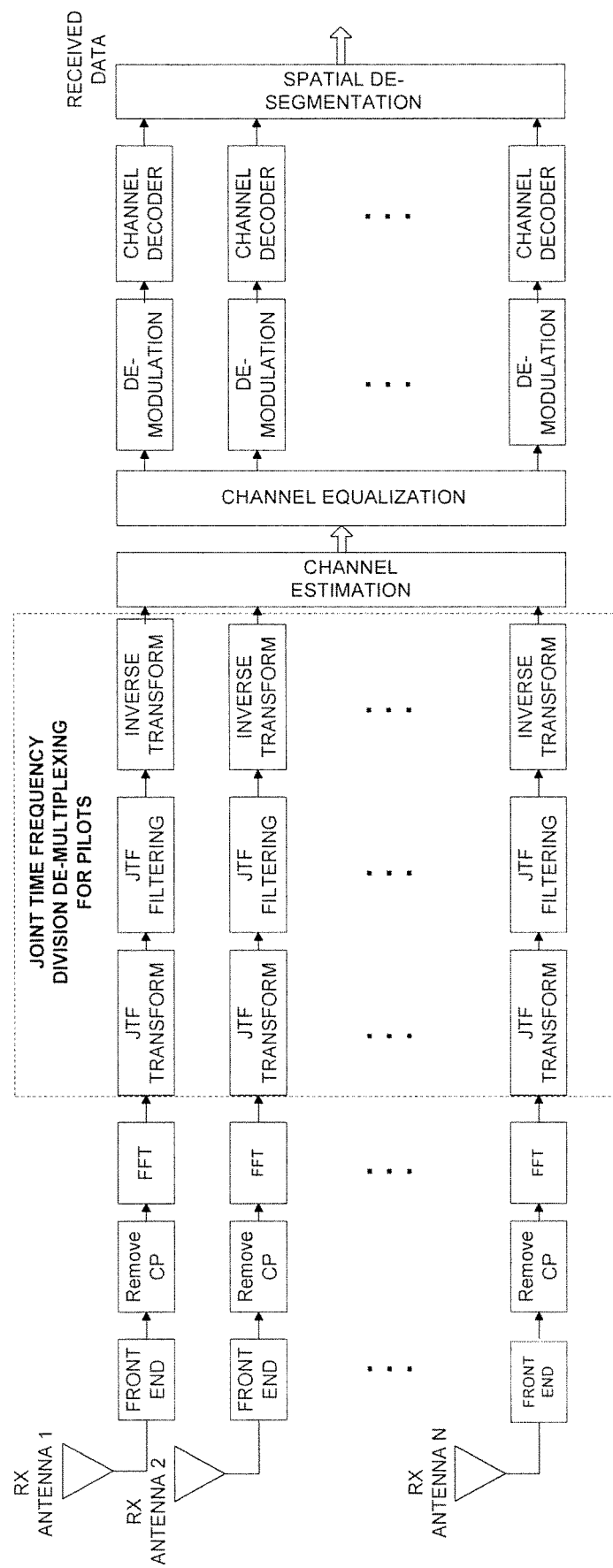
FIG. 10 shows block diagram of a receiver for a wireless OFDMA system that uses JTFDM for pilots.
Figure 11:
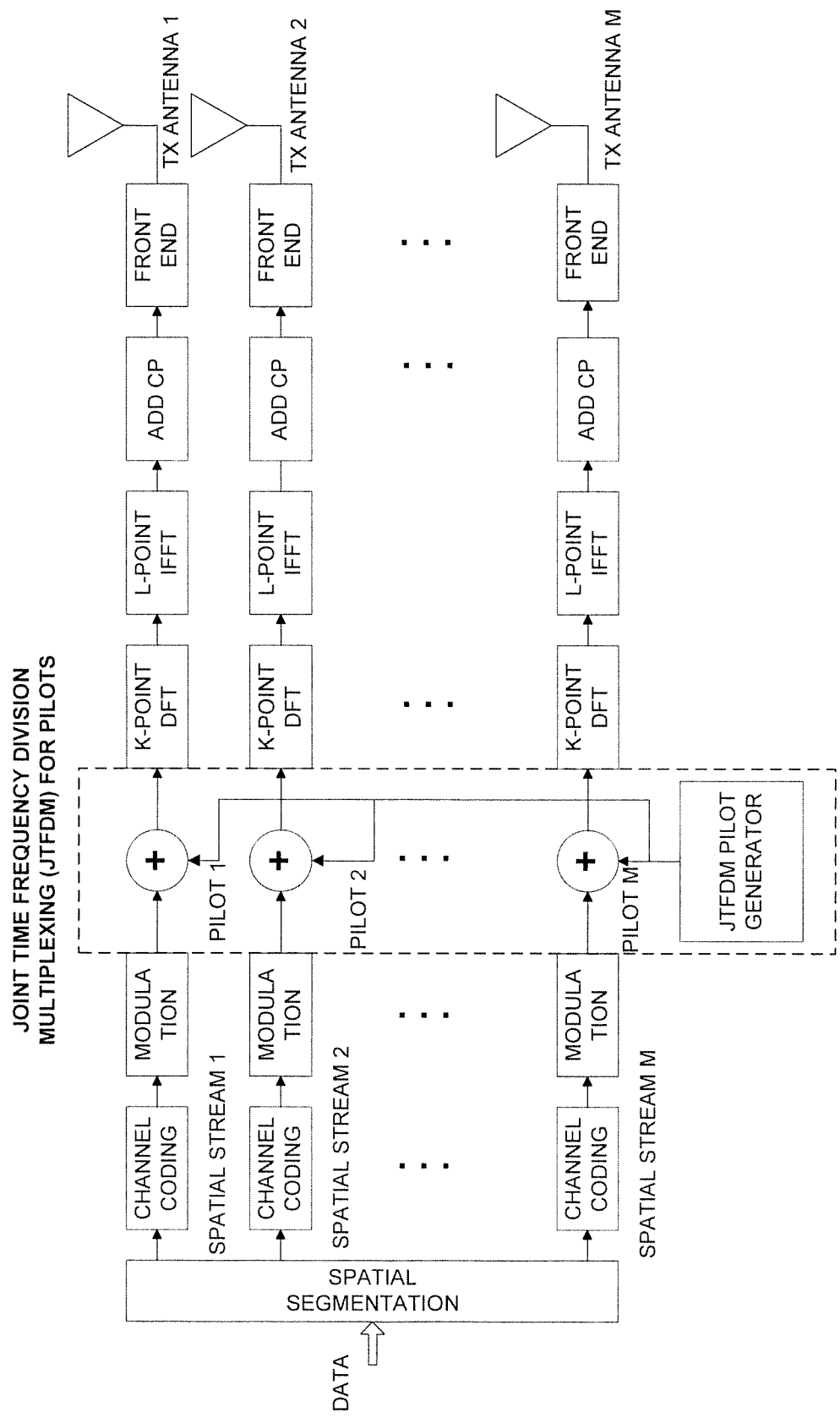
FIG. 11 shows block diagram of JTFDM for pilots in SC-FDMA transmitter.
Figure 12:
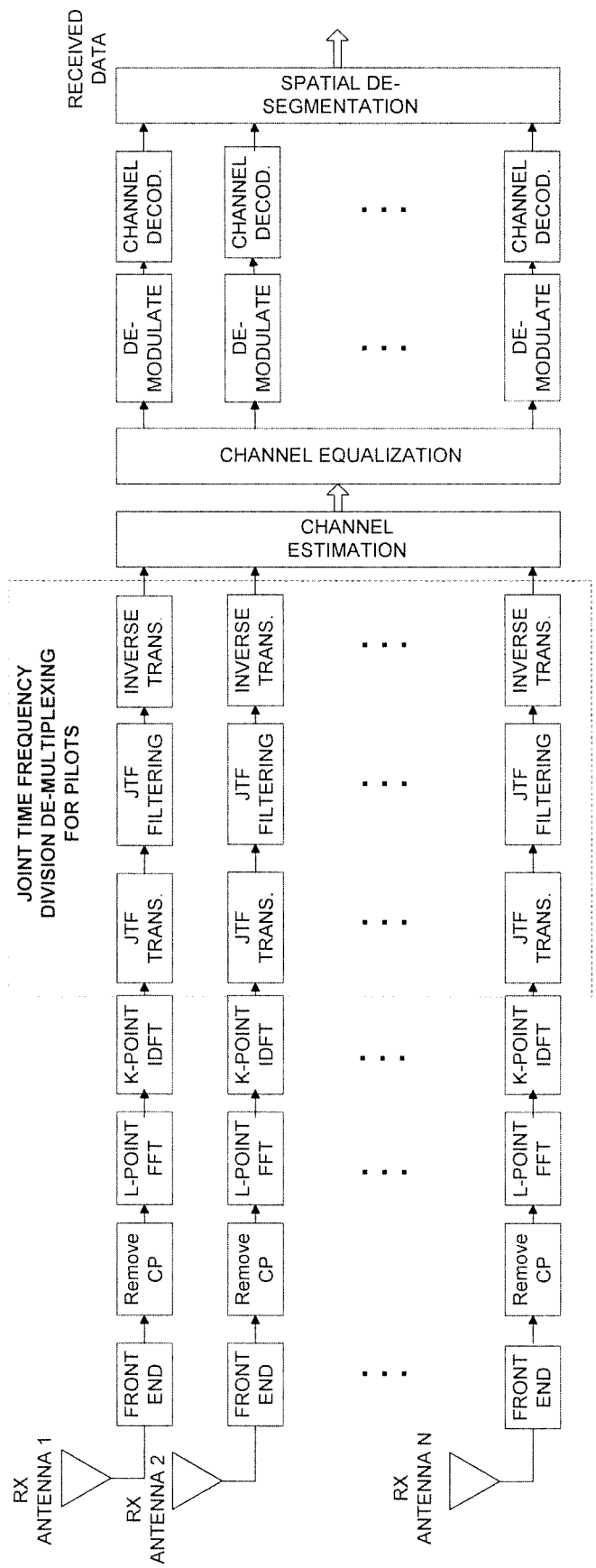
FIG. 12 shows of a receiver for a wireless SC-FDMA system that uses JTFDM for pilots.
Figure 13:
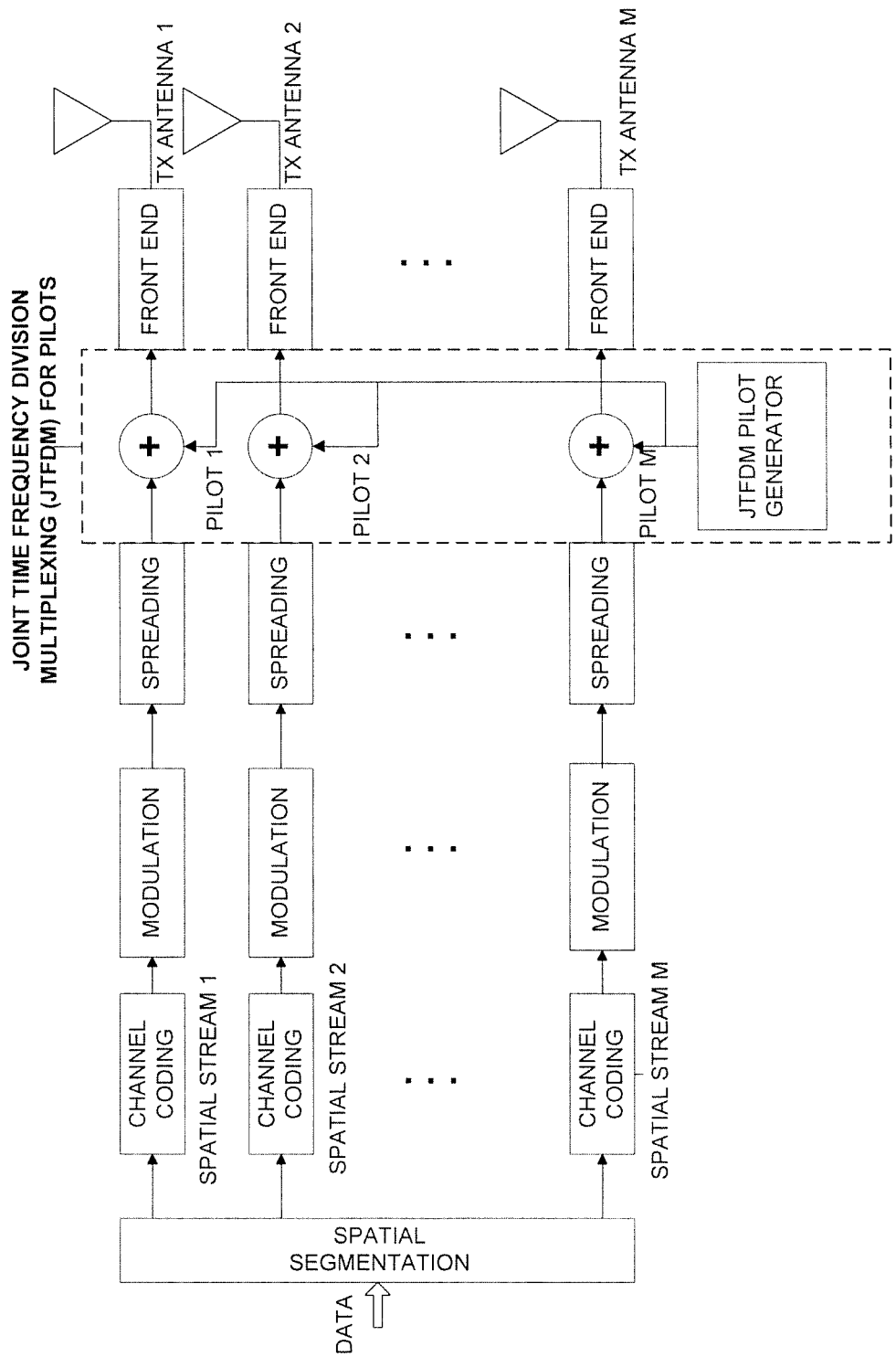
FIG. 13 shows block diagram of JTFDM for pilots in CDMA transmitter.
Figure 14:
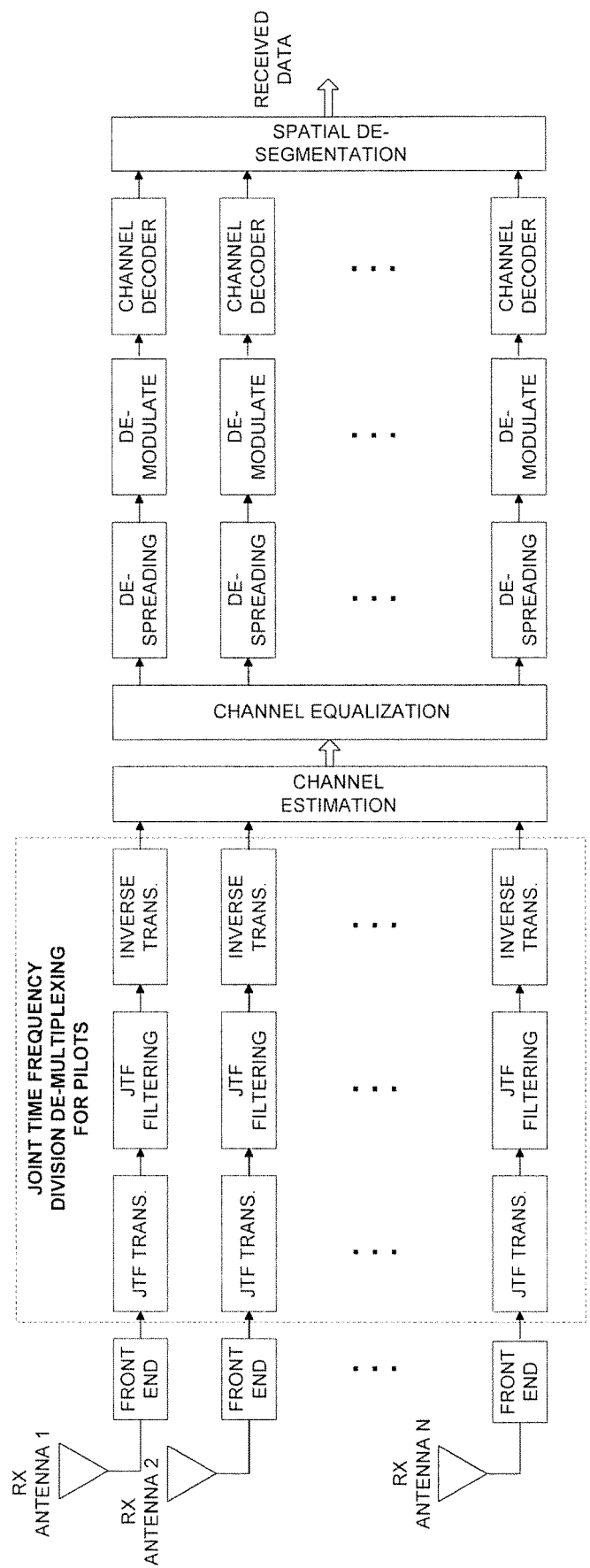
FIG. 14 shows block diagram of a receiver for a wireless CDMA system that uses JTFDM for pilots.
Figure 18:
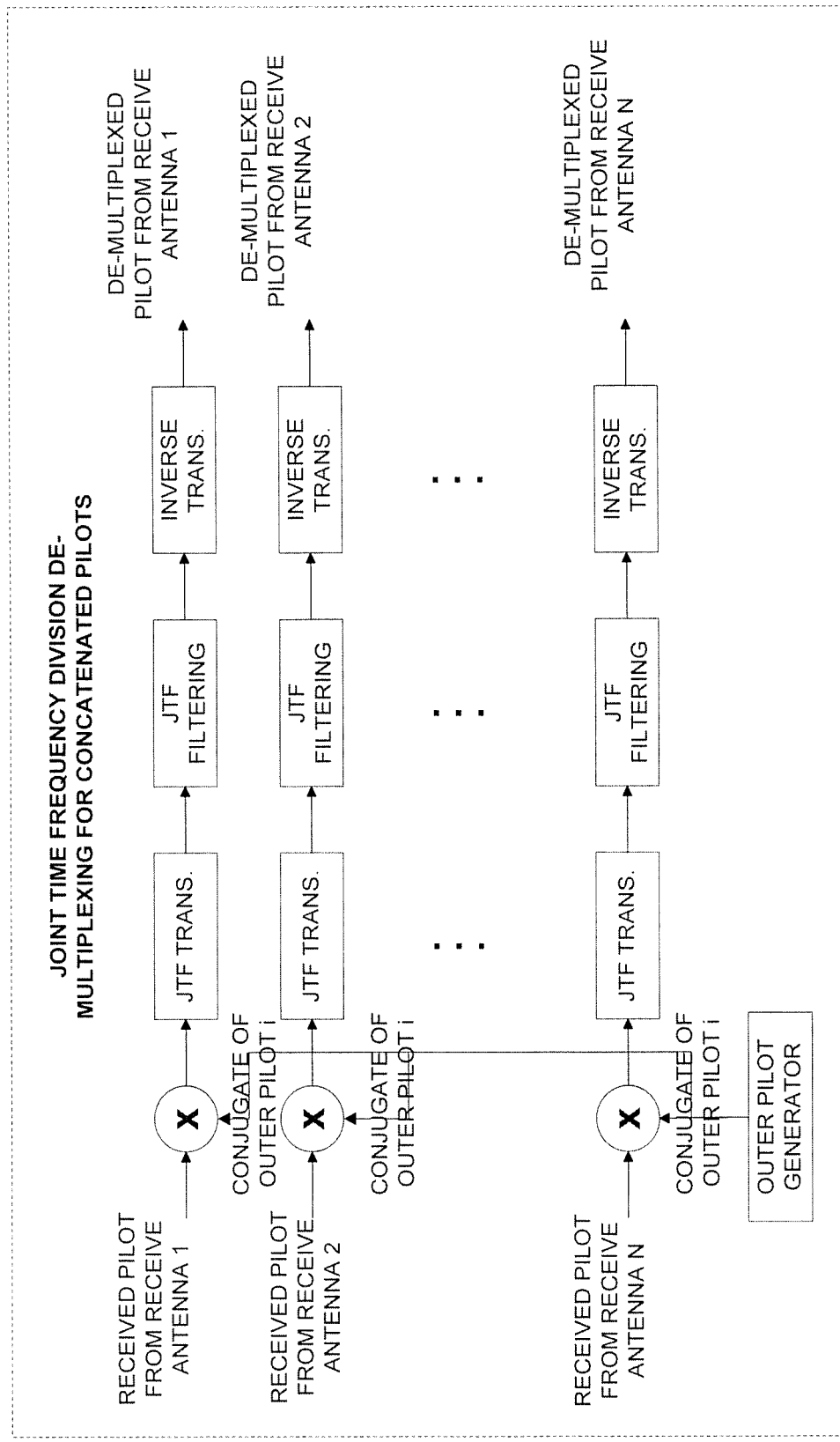
FIG. 18 shows JTFD de-multiplexing for concatenated pilots in the receiver.
Figure 19:
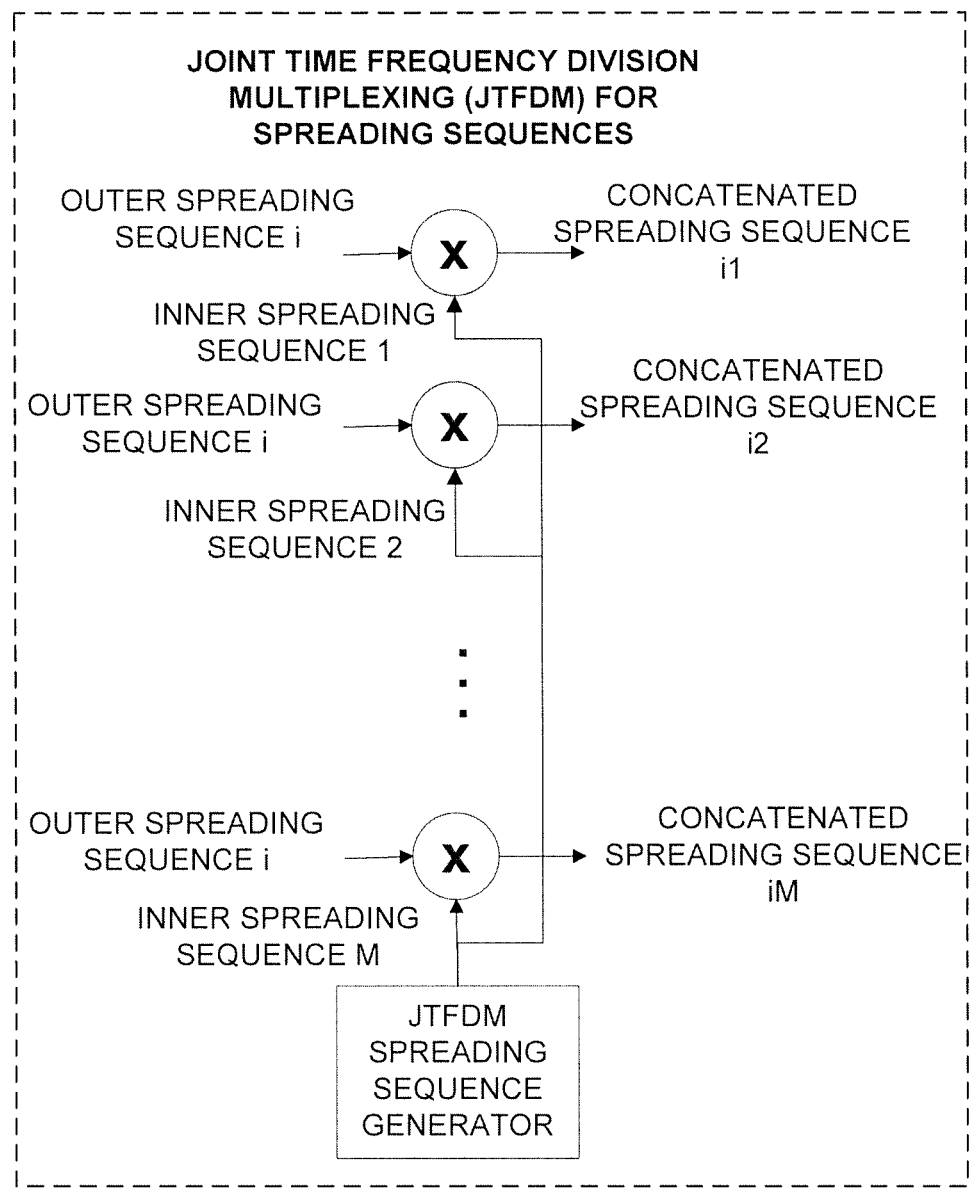
FIG. 19 shows JTFDM concatenated spreading sequence generation in JTFDMA transmitter.
Figure 20:
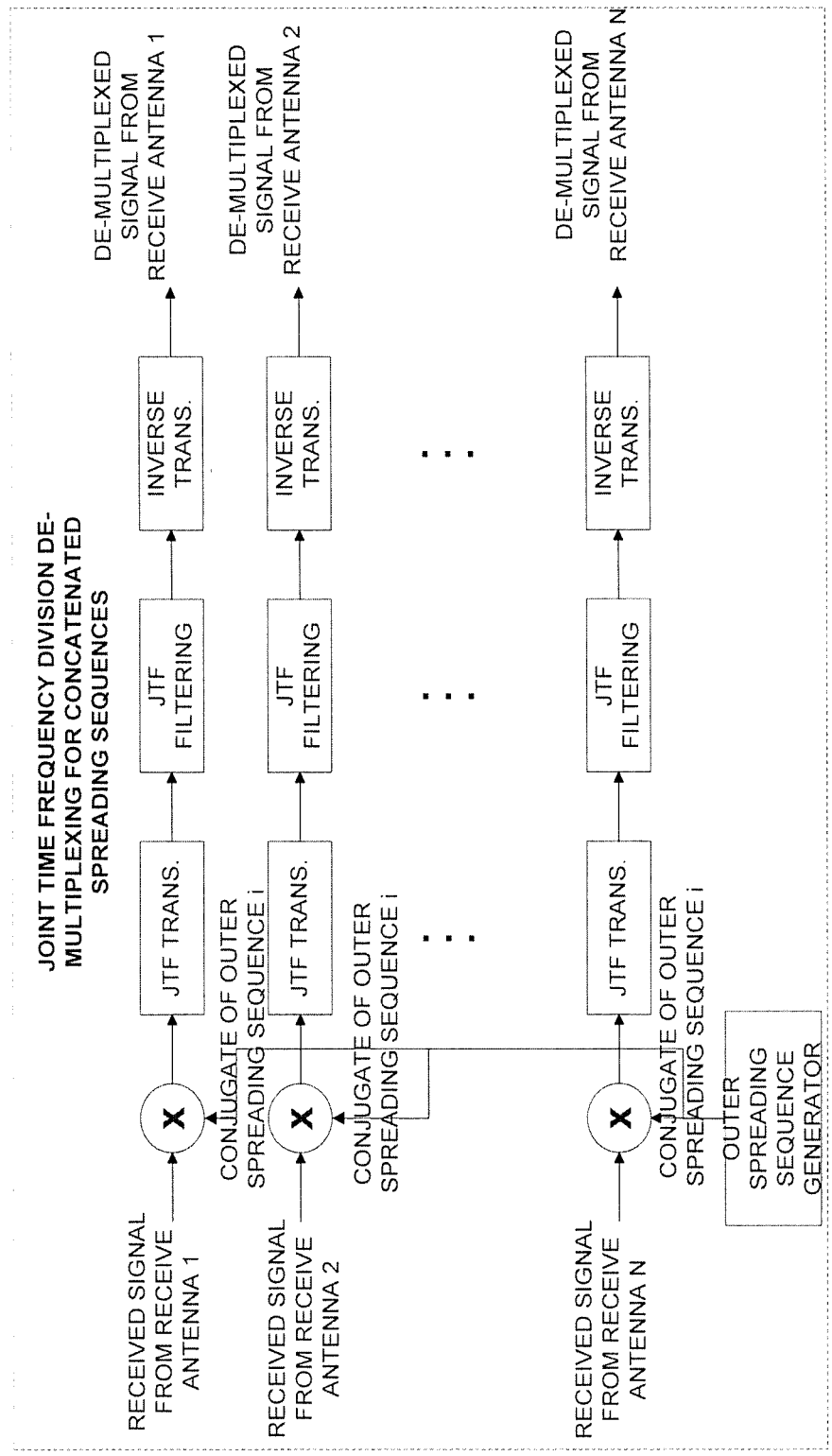
FIG. 20 shows JTFD de-multiplexing for concatenated spreading sequences in JTFDMA receiver.

The receiver processing of concatenated pilots are shown in FIG. 18. Before the JTF filter is applied, the received pilot is de-scrambled first with the outer pilot. De-scrambling means multiplication of the received pilot by the complex conjugate of the outer pilot sequence element by element. This can be written as $$\tilde{r}(n)=\tilde{r}_c(n) \cdot \text{conj}(r_o(n)), 0 \leq n \leq N-1, \quad (36)$$

where $\tilde{r}_c(n)$ is the received total pilot signal in the receiver, $r_o(n)$ is the corresponding outer pilot sequence for the particular pilot, and $\tilde{r}(n)$ is the extracted pilot sequence just prior to JTFD de-multiplexing processing. After the descrambling, the JTF filtering is applied. It is very important to note that, the modified Gabor synthesis windows obtained previously through linear operations between Gaussian and pilot sequences are only valid with inner pilots with desired time-frequency slopes. Outer pilots are not used in Gabor synthesis windows at all. This will ensure that JTFDM can be de-multiplexed properly and de-noising work effectively. The JTF filtering operation is the same as before as described in detail for non-concatenated pilots. Note that, received inner pilots are obtained after the JTFD de-multiplexing is completed. This completes the pre-processing required for JTFDM in the receiver. It is followed by channel estimation and the rest of the receiver processing as shown in FIG. 10. Note that the following processing blocks are well known in the prior art by people in the industry.

JTFDM scheme can be configured in different ways such as common pilot or UE-specific pilots. If JTFDM is used for common pilots, then the pilots use the whole transmission bandwidth. This has several advantages. First, common pilots can be used for both channel estimation for demodulation purposes and channel state information (CSI) measurement for reporting to BS. This will reduce total number of pilots required. Another advantage of using wide band common pilots is that SNR gain increases with de-noising with the pilot length increase as seen from equation (34). Finally, longer length of pilots minimize the minimum cross correlation between different pilots. However, JTFDM can also be configured for UE specific pilots. In this scheme, there are at least two pilot sets. One pilot set is wideband for CSI measurements and it is transmitted less frequently. Second pilot set is specifically for channel estimation for demodulation purposes. The latter set is called UE specific pilots. UE specific pilots are transmitted more frequently within channel coherence time. However, UE specific pilots are transmitted only for time and frequency resources dedicated for that UE. As an example from an LTE system, for user A who has a dedicated resource block (RB) 1 with 2 antennas and user B who has a dedicated RB 2 with 4 antennas, there are two UE specific pilots in RB 1 and 4 UE specific pilots in RB 2. Each RB includes 12 subcarriers of 15 KHz each for a total of 180 kHz bandwidth and spans two time slots for a total of 1 msec. In UE specific schemes, since the length of pilot sequences are smaller, de-noising gain is decreased. Note that UE specific pilots are introduced with LTE-A, due to increasing number of transmission antennas. However, if JTFDM were to be used for LTE, there would probably not be a need for separate pilots. Because, JTFDM can transmit 12 pilots per OFDM symbol instead of 3 for the LTE and LTE-A downlink. This number is obtained from the equation (1) for maximum number of pilots minus one, $$N_p = \frac{T_u}{T_{d,max}} = \frac{66.7 \ \mu\sec}{5 \ \mu\sec} \approx 13. \quad (37)$$

Figure 6:
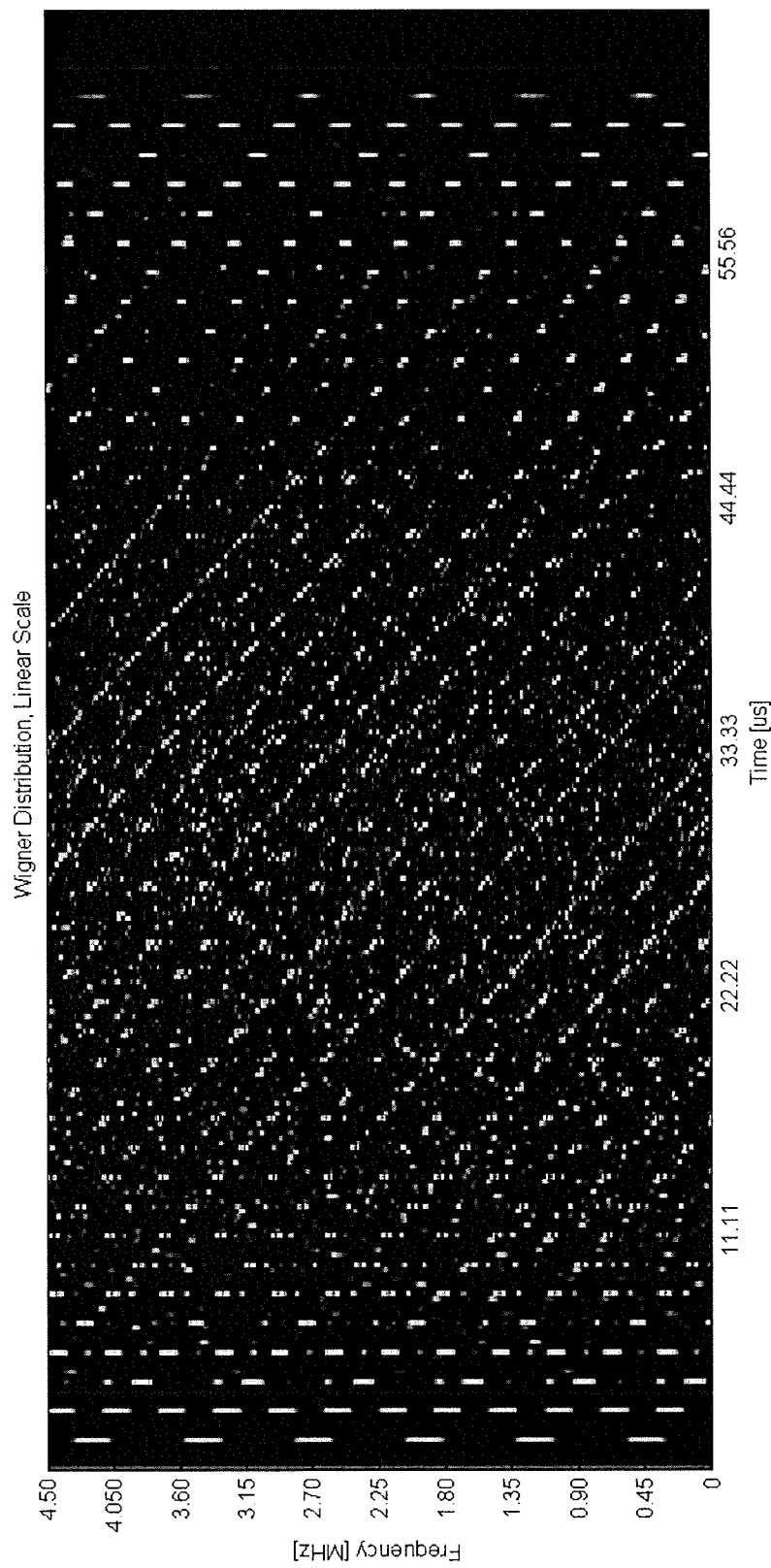
FIG. 6 shows Wigner distribution (WD) of 12 Zadoff-Chu pilots multiplexed with JTFDM.
Figure 7:
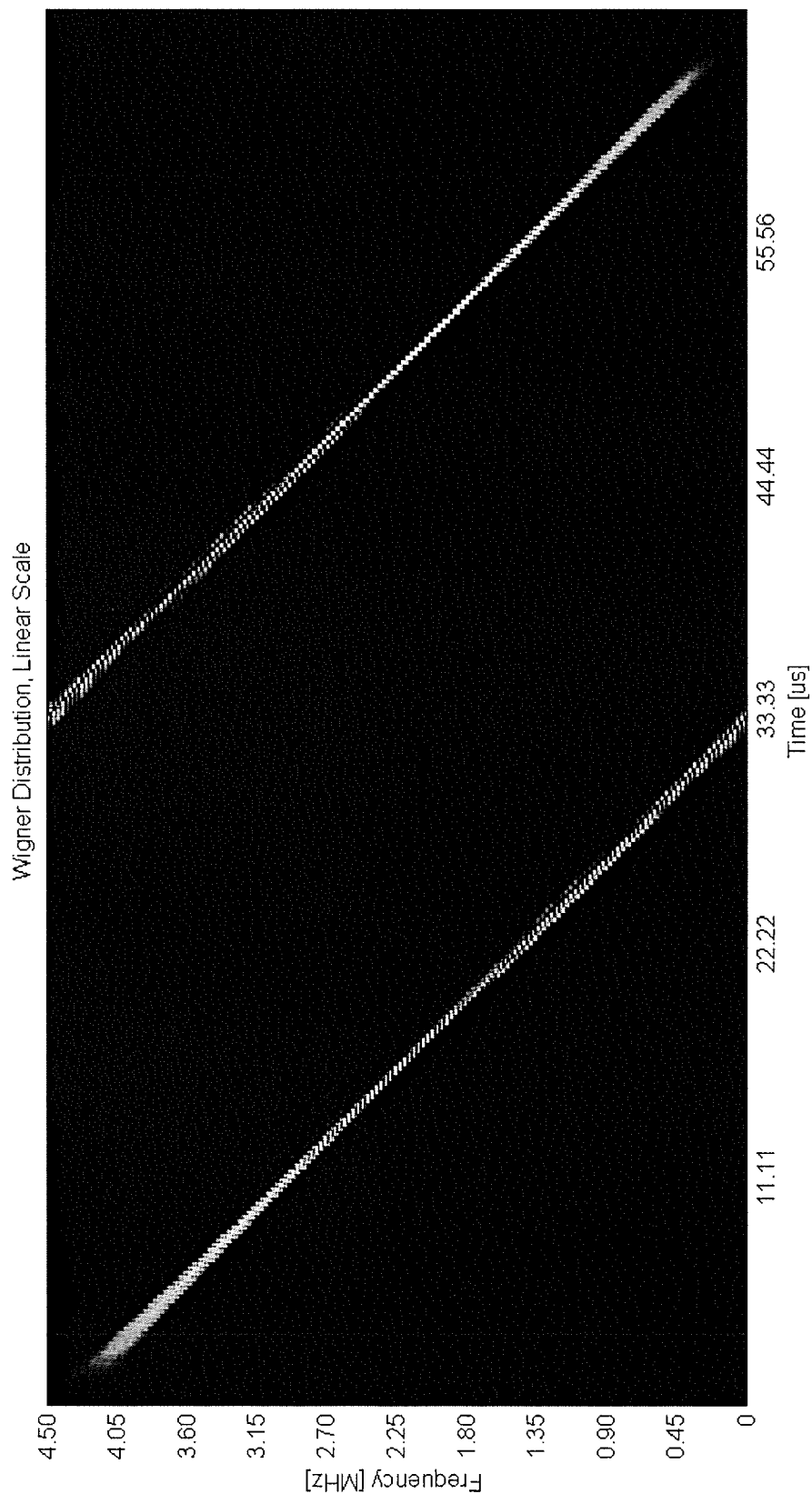
FIG. 7 shows Wigner distribution (WD) of Zadoff-Chu pilot sequence for s=−1 after JTFD de-multiplexed in the receiver.
Figure 8:
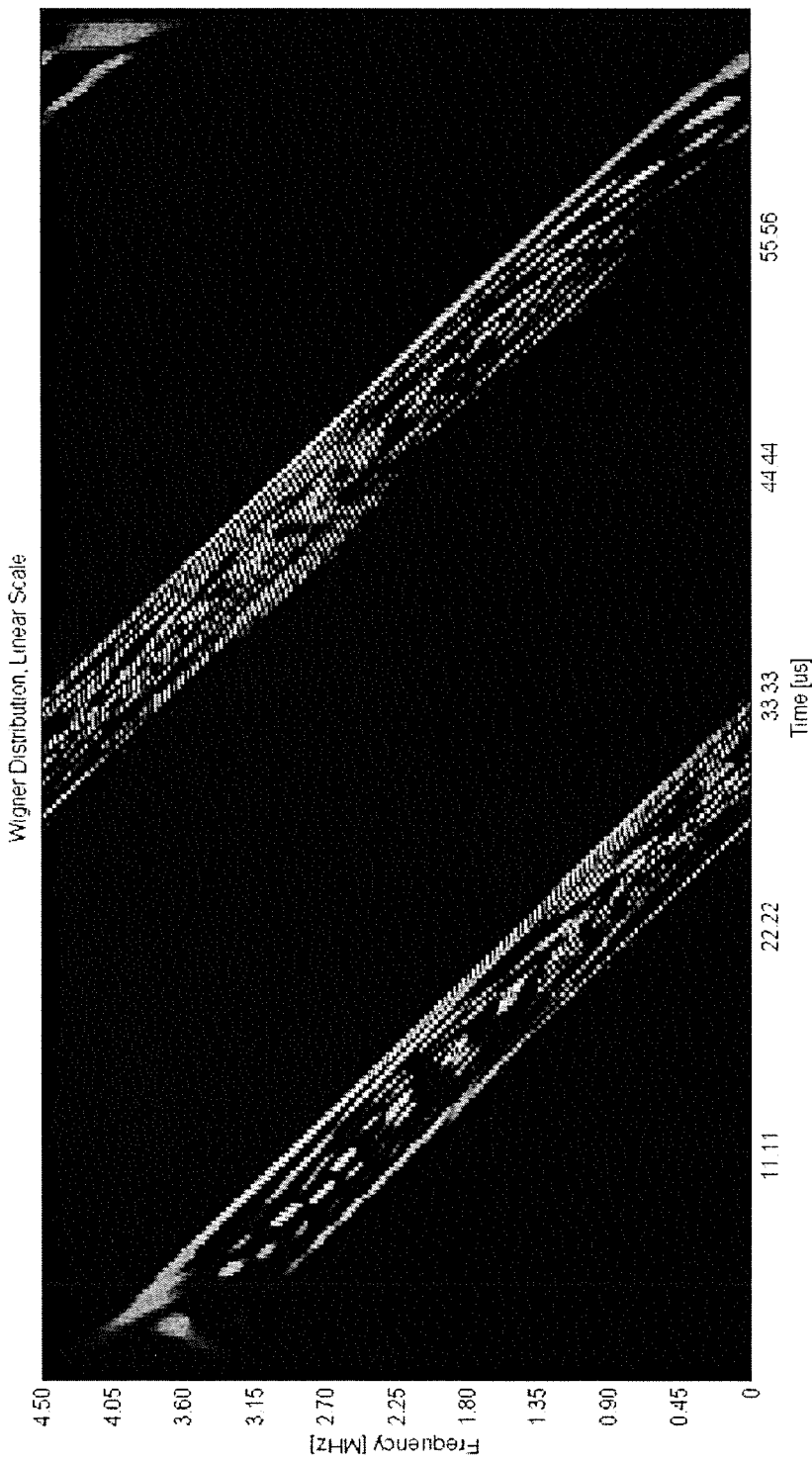
FIG. 8 shows Wigner distribution (WD) of Gabor mask used in JTFD de-multiplexing operation in the receiver.
Figure 9:
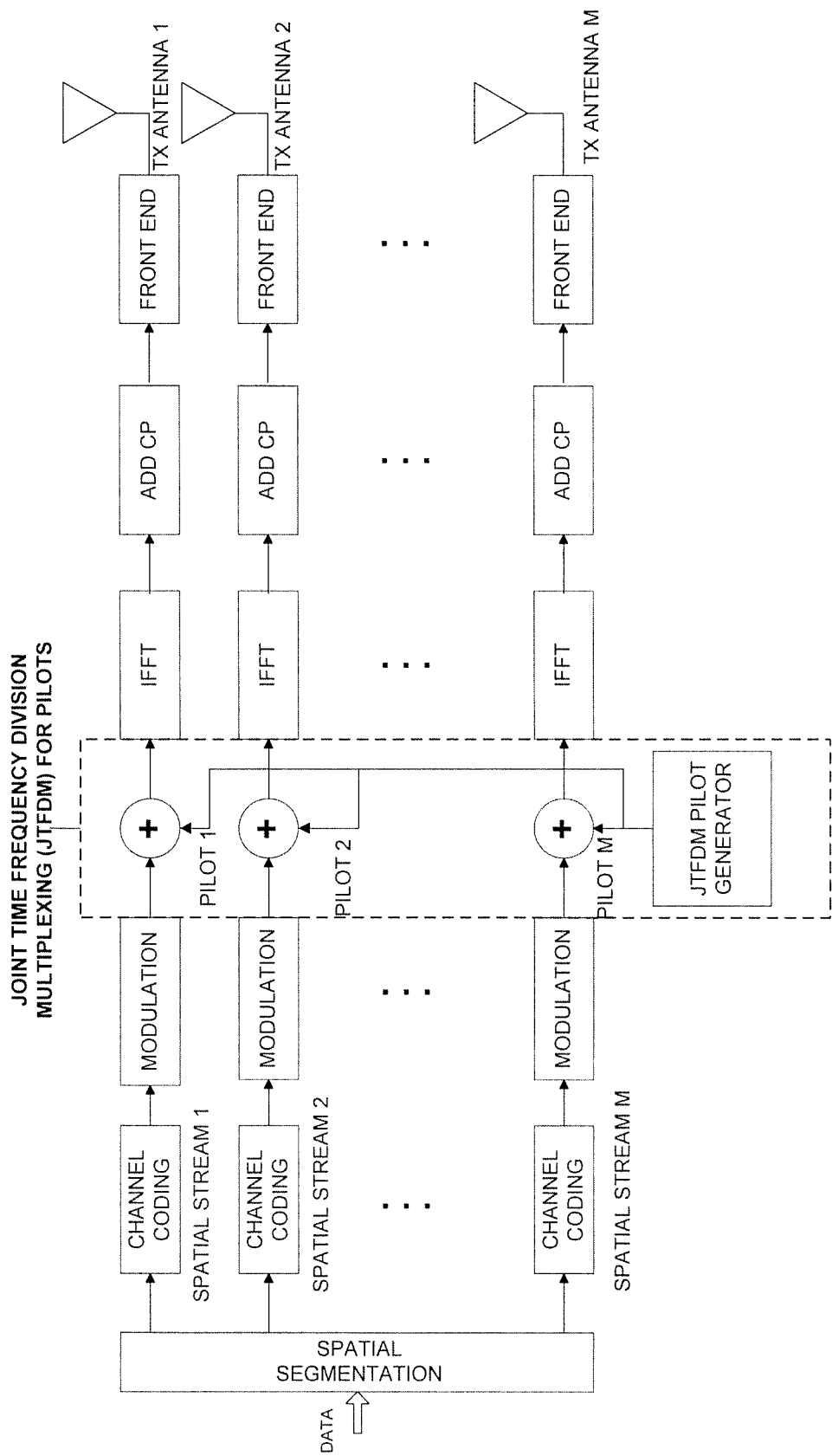
FIG. 9 shows block diagram of JTFDM for pilots in OFDMA transmitter.

Because of JTF filter headroom one less than maximum is suggested as explained before. JTFDM for 12 pilots with s=−1 without outer pilot code is shown in FIG. 6.

JTFDM in Data Communications

Throughout the previous sections, JTFDM is being applied to channel estimation for data demodulation. However, JTFDM is a new multiplexing technique and as such can be applied to many others areas where multiplexing takes place. Another important application of JTFDM in wireless communications is data transmission. In this case, JTFDM can be used as multiple access scheme for multi user communications. It can be called as joint time-frequency division multiple access (JTFDMA) for such applications. The concept is described below for a CDMA system.

Figure 15:
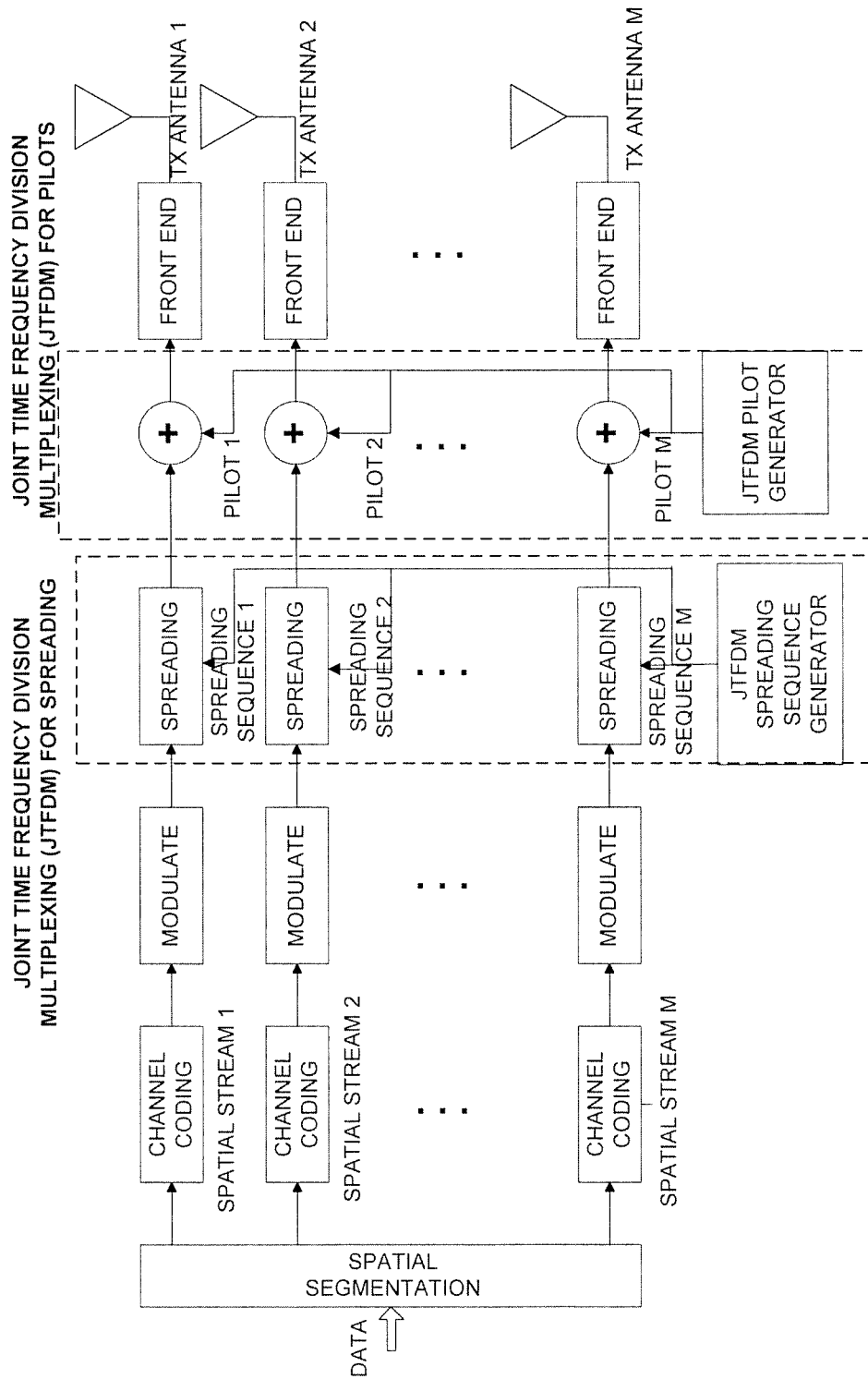
FIG. 15 shows block diagram of JTFDMA for data and JTFDM for pilots transmitter obtained from CDMA system.
Figure 16:
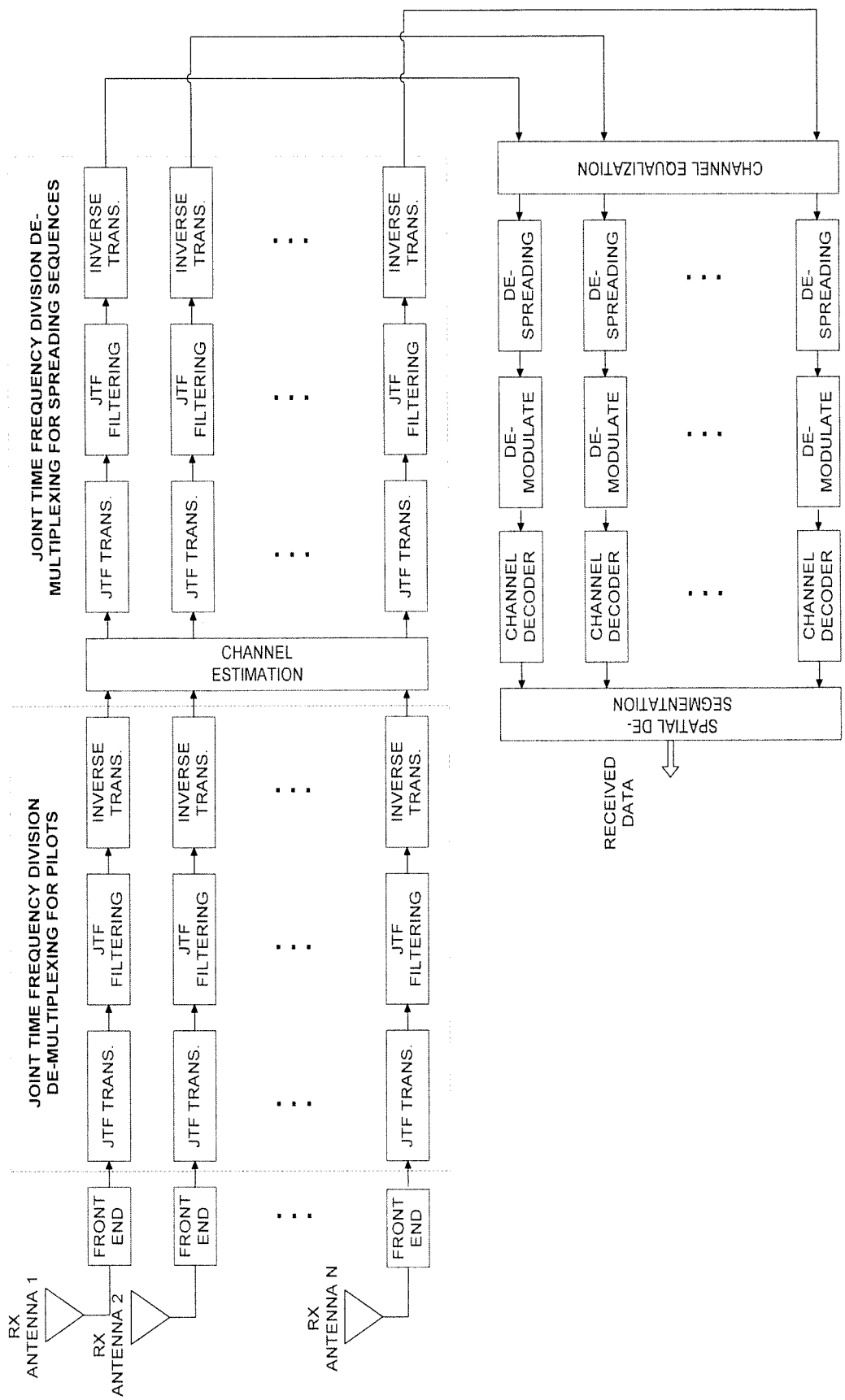
FIG. 16 shows block diagram of JTFDMA for data and JTFDM for pilots receiver obtained from CDMA receiver.

In FIG. 15 and FIG. 16, JTFDMA system transmitter and receivers are shown, respectively. JTFDMA transmitter in FIG. 15 is obtained by modifying the spreading sequences of classical CDMA system. In this system each user is identified by its distinct spreading sequence. The spreading sequences can be obtained in two ways as defined in the previous sections for JTFDM pilots. If the required number of spreading sequences are limited, then the PSS root sequences close to unity slope are chosen as described before. The cyclic shifted versions of these root sequences are created such that cyclic shifts are proportional to maximum delay spread of the channel. As the number of users increase, more spreading sequences are required than the first method. In this case, spreading sequences are obtained through concatenating two spreading sequences as it is done for concatenated pilots. Final concatenated spreading sequence is obtained by scrambling the inner spreading sequence by the outer spreading sequence. Inner and outer spreading sequences are exactly the same as described in the previously for pilots. Note that outer spreading sequence can be used to differentiate between different cells or base stations in a wireless network and inner spreading sequences might be used for different transmit antennas of a base station. However, this is not always the case. For example, the number of transmit antennas increase significantly in the case of high order MIMO, some of the outer spreading sequences can be used for transmit antennas as well. There is no restriction to group these inner and outer sequences which gives flexibility for a wireless system architect.

Note that JTFDMA, which is used for data transmission in FIG. 15, might be complemented with JTFDM pilots. They can be used independent of each other or they can be used together. When they are used together as a preferred approach, the gain from data estimation and gain from channel estimation will add up and provide better wireless system with higher rates and higher reliability.

In FIG. 16, JTFDMA receiver is shown. If the transmitter use JTFDM for pilots, then the receiver has to use JTFD demultiplexing stage as described in the previous section. If the transmitter did not use JTFDM pilots, then this stage is skipped. After JTFD de-multiplexing is complete, channel estimation is performed. Before the demodulation, JTFD demultiplexing for spreading sequences need to be performed. This is same as JTFD demultiplexing for pilots where pilot sequences are simply replaced by spreading sequences. After JTFD for spreading sequences are performed, channel equalization takes place. When there is delay spread in the channel, JTFD significantly increase the performance of the channel equalizer and the rest of the receive chain. This is due to the fact that, when there is delay spread, orthogonality of the spreading sequences are poor and signal separation by CDM becomes very difficult. However, JTF filters can successfully separate different spreading sequences since they have fixed signatures in the JTF plane. But the gains are not limited to delay spread channel only, JTFDMA also provides significant gains due to noise reduction. The noise reduction gain is the same as in equation (34). So, JTFDMA provides outstanding improvements for both simple white band noise and frequency selective fading channels.

The benefits from using the JTFDM can be summarized as follows. First, it provides low PAPR solution in addition to well known properties such as excellent auto and cross correlations. It provides best PAPR solution compared to the prior art. JTFDM also achieves the maximum number of pilots per symbol without any distortion in receiver performance. This results in achieving the theoretical maximum capacity for high order MIMO systems. As a big bonus, it significantly improves channel estimation performance in receivers by filtering in band noise. All these benefits can be applied towards data transmission when JTFDM is applied to data carrying signals such as spreading sequences.

Examples of the processors that can be used in a transmitter, receiver, or transceiver described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 21:
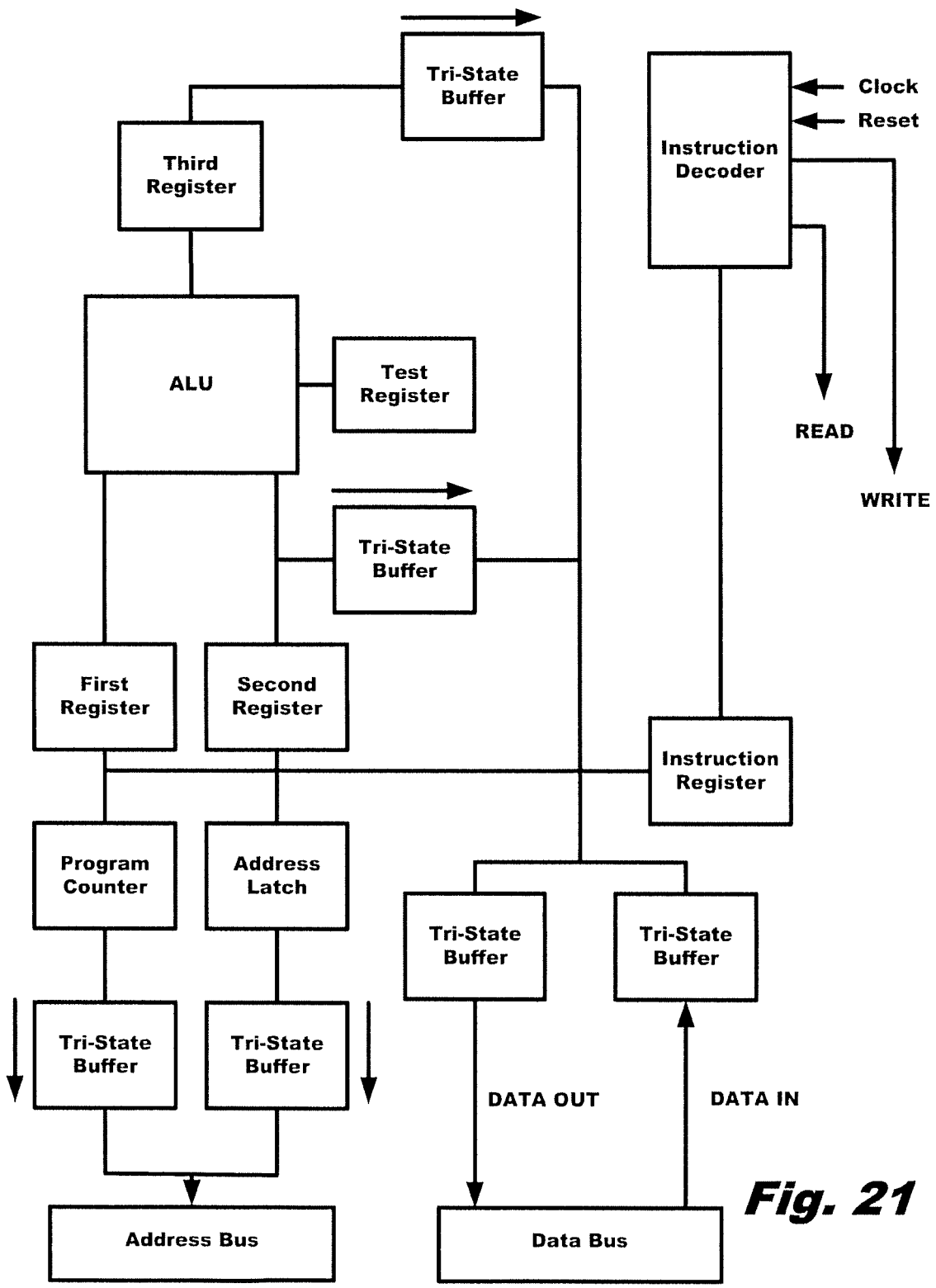
FIG. 21 depicts a block diagram for a processing architecture to perform operations disclosed herein.

With reference to FIG. 21, the transmitter, receiver, or transceiver can execute the signal processing instructions described herein using an arithmetic/logic unit ("ALU"), which performs mathematical operations, such as addition, subtraction, multiplication, and division, machine instructions, an address bus (that sends an address to memory), a data bus (that can send data to memory or receive data from memory), a read and write line to tell the memory whether to set or get the addressed location, a clock line that enables a clock pulse to sequence the processor, and a reset line that resets the program counter to zero or another value and restarts execution. The arithmetic/logic unit can be a floating point processor that performs operations on floating point numbers. The system further includes first, second, and third registers that are typically configured from flip-flops, an address latch, a program counter (which can increment by "1" and reset to "0"), a test register to hold values from comparisons performed in the arithmetic/logic unit, plural tri-state buffers to pass a "1" or "0" or disconnect its output (thereby allowing multiple outputs to connect to a wire but only one of them to actually drive a "1" or "0" into the line), and an instruction register and decoder to control other components. Control lines from the instruction decoder can: command the first register to latch the value currently on the data bus, command the second register to latch the value currently on the data bus, command the third register to latch the value currently output by the ALU, command the program counter register to latch the value currently on the data bus, command the address register to latch the value currently on the data bus, command the instruction register to latch the value currently on the data bus, command the program counter to increment, command the program counter to reset to zero, activate any of the plural tri-state buffers (plural separate lines), command the ALU what operation to perform, command the test register to latch the ALU's test bits, activate the read line, and activate the write line. Bits from the test register and clock line as well as the bits from the instruction register come into the instruction decoder. The ALU executes instructions for the logic described above.

Any of the steps, functions, and operations discussed herein can be performed continuously and automatically.

The exemplary systems and methods of this disclosure have been described in relation to cellular networks. However, to avoid unnecessarily obscuring the present disclosure, the preceding description omits a number of known structures and devices. This omission is not to be construed as a limitation of the scopes of the claims Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a transceiver, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a mobile device, base station, switch, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

For example in one alternative embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A signal transmitter, comprising:
a signal emitter; and
a processor that converts information to be emitted by the signal emitter into a plurality of signals, each signal having a concatenated emitting waveform, wherein each of the concatenated emitting waveforms comprises an inner code and an outer code, the outer code providing orthogonality between multiple codes in the corresponding concatenated emitting waveform and differing from the inner code and the inner code being localized in a joint time-frequency plane and spread both in time and frequency as separate domains, wherein each of the concatenated emitting waveforms has a respective instantaneous frequency (IF) line that differs from the IF lines of the other concatenated emitting waveforms.

2. The signal transmitter of claim 1, wherein the IF lines are time shifted from one another by an amount equal to a maximum delay spread.

3. The signal transmitter of claim 2, wherein the transmitter is part of a base station, wherein the transmitter comprises multiple antennas, each antenna corresponding to one of the respective IF lines thereby preventing overlapping of the plurality of signals.

4. The signal transmitter of claim 1, wherein each of the inner codes provides a minimal joint-time frequency spread in the joint time-frequency plane and a highest concentration of energy in the joint time-frequency plane.

5. The signal transmitter of claim 1, wherein inner code is configured as a Perfect Polyphase Sequence (PPS) and wherein the PPS comprises one or more of a Zadoff, Chu, Zadoff-Chu, Frank and generalized chirp like (GCL) sequence, and wherein the inner code cannot be de-multiplexed in the time or frequency domain alone.

6. The signal transmitter of claim 1, wherein a first concatenated emitting waveform is set at a zero time shift, wherein a second concatenated emitting waveform is set at a non-zero time shift, and wherein the zero time shift differs from the non-zero time shift by an amount equal to a maximum delay spread.

7. The signal transmitter of claim 1, wherein at least two of the time-frequency distributions of the emitting signal waveforms are separated from one another in a joint time-frequency plane by a parallelogram shaped region, wherein adjacent first and second time-frequency distributions of the emitting signal waveforms are separated in the joint time-frequency plane by a first parallelogram, wherein the time-frequency distribution of the second emitting signal waveform and an adjacent third emitting signal waveforms are separated in the joint time-frequency plane by a second parallelogram, wherein the first and second parallelograms are adjacent to one another, wherein the emitted signals are propagated in a propagation channel, and wherein the separation of the first and second parallelograms in the time domain of the joint time-frequency plane is proportional to the maximum delay spread of the propagation channel.

8. A system, comprising:
a signal receiver to receive emitted signals in the form of time-frequency spread waveforms; and
a processor that separates received time-frequency spread waveforms from one another, the time-frequency spread waveforms being concatenated waveforms having respective inner and outer codes, each of the outer codes providing orthogonality between multiple codes in the corresponding concatenated emitting waveform and the inner code in the corresponding concatenated emitting waveform differing from the outer code, having an energy focused around a instantaneous frequency (IF) line of the corresponding concatenated emitting waveform, having a time dependent phase, and being localized in a joint time-frequency plane, wherein the processor separates the received time-frequency spread waveforms from one another using plural joint time-frequency filters, each filter of the plurality of joint time-frequency filters being centered around a respective one of the IF lines of the received time-frequency spread waveforms.

9. The system of claim 8, wherein the IF lines are time shifted from one another by an amount equal to a maximum delay spread.

10. The system of claim 8, wherein the transmitter is part of a base station, wherein the transmitter comprises multiple antennas, each antenna corresponding to one of the respective IF lines thereby preventing overlapping of the plurality of signals.

11. The system of claim 8, wherein each of the inner codes provides a minimal joint-time frequency spread in the joint time-frequency plane and a highest concentration of energy in the joint time-frequency plane.

12. The system of claim 8, wherein each joint time-frequency filter filters a received time-frequency spread waveform by calculating a respective joint time-frequency energy distribution (TFD) of the received time-frequency spread waveform, applying a selected joint time-frequency filter, and taking an inverse TFD to obtain a corresponding joint time-frequency filtered signal.

13. The system of claim 12, wherein a respective passband of each joint time-frequency filter covers an area bound by a delay spread of a channel from the IF line.

14. The system of claim 8, wherein each of the plural joint time-frequency filters corresponds to a joint time-frequency filter set and wherein each of the joint time-frequency filter sets are obtained using a modified Gabor transform.

15. The system of claim 8, wherein each of the plural joint time-frequency filters corresponds to a joint time-frequency filter set, wherein each of the plural joint time-frequency filter sets is equal to ones in a joint time-frequency region where waveform energy for the corresponding IF line is focused and zeros where the waveform energy is not focused, wherein the processor de-multiplexes the received time-frequency spread waveforms from one another using a discrete Gabor transform of the received time-frequency spread waveforms by multiplying the discrete Gabor transform coefficients with a selected joint time-frequency filter set to form a filtered signal and takes an inverse discrete Gabor transform of the filtered signal.

16. The system of claim 15, wherein the processor forms a parallelogram that extends from the IF line of the received time-frequency waveform by an amount equal to a maximum channel delay spread associated with the received time-frequency waveform and wherein one or more joint time-frequency filter sets has values equal to ones inside the parallelogram and zeros outside the parallelogram.

17. The system of claim 15, wherein the processor separates the received time-frequency spread waveforms by one or more joint time-frequency filter sets and wherein the processor forms one or more filter sets by using empirical threshold techniques.

18. The system of claim 8, wherein the processor separates the received time-frequency spread waveforms by one or more joint time-frequency filter sets and wherein the one or more joint time-frequency filter sets separates the parallelogram shaped time-frequency spread waveforms after the processor removes an outer code from a concatenated code associated with each of the received time-frequency waveforms.

19. The system of claim 18, wherein the processor separates the received time-frequency spread waveforms by one or more joint time-frequency filter sets and wherein the one or more joint time-frequency filter sets is obtained using parallelogram geometry relations of the time-frequency spread waveforms in the joint time-frequency plane.

20. The system of claim 1, wherein each of multiple users is identified by a distinct spreading sequence, wherein each of the concatenated emitting waveforms comprises multiple different spreading sequences, wherein root sequences of the multiple different spreading sequences each has an IF line having close to unity slope to inhibit a chirp line from one spreading sequence from interfering with an adjacent spreading sequence, wherein the processor cyclic shifts versions of the spreading sequences, and wherein the cyclic shifts are proportional to a maximum delay spread of a channel propagating the emitting waveforms.

21. The system of claim 8, wherein the plural joint time-frequency filters is equal to ones in a joint time-frequency region where waveform energy is focused and zeros where waveform energy is not focused, wherein the processor de-multiplexes the received time-frequency spread waveforms from one another using a discrete Gabor transform of the received time-frequency spread waveforms, multiplies the discrete Gabor transform coefficients with the one or more joint time-frequency filter sets to form a filtered signal, and takes an inverse discrete Gabor transform of the filtered signal.

22. The system of claim 21, wherein the processor forms a parallelogram that extends from an instantaneous frequency line of the received time-frequency waveform by an amount equal to a maximum channel delay spread associated with the received time-frequency waveform and wherein one or more joint time-frequency filter sets has values equal to ones inside the parallelogram and zeros outside the parallelogram.

23. The system of claim 21, wherein the processor separates the received time-frequency spread waveforms by one or more joint time-frequency filter sets and wherein the processor forms one or more filter sets by using empirical threshold techniques.

24. A method, comprising:
receiving, by a signal receiver, emitted signals in the form of time-frequency spread waveforms; and
separating, by a processor, the received time-frequency spread waveforms from one another, wherein the received time-frequency spread waveforms are concatenated emission waveforms having inner and outer codes, each of the outer codes providing orthogonality between multiple codes in the corresponding concatenated emitting waveform and the inner code in the corresponding concatenated emitting waveform differing from the outer code, having an energy focused around an instantaneous frequency (IF) line of the corresponding concatenated emitting waveform, having a time dependent phase, and being localized in a joint time-frequency plane, wherein the processor separates the received time-frequency spread waveforms from one another using plural joint time-frequency filters, each filter of the plurality of joint time-frequency filters being centered around a respective one of the IF lines of the received time-frequency spread waveforms.

25. The method of claim 24, wherein the inner codes provide minimal joint-time frequency spread in the joint time-frequency plane, wherein one or more joint time-frequency filter sets is equal to ones in a joint time-frequency region where waveform energy is focused and zeros where waveform energy is not focused and further comprising:
de-multiplexing, by the processor, the received time-frequency spread waveforms from one another using a discrete Gabor transform of the received time-frequency spread waveforms;
multiplying, by the processor, the discrete Gabor transform coefficients with the one or more joint time-frequency filter sets to form a filtered signal; and
taking, by the processor, the inverse discrete Gabor transform of the filtered signal.

* * * * *